US012591358B2

(12) United States Patent
Holzer et al.

(10) Patent No.: US 12,591,358 B2
(45) Date of Patent: Mar. 31, 2026

(54) DAMAGE DETECTION PORTAL

(71) Applicant: Fyusion, Inc., San Francisco, CA (US)

(72) Inventors: Stefan Johannes Josef Holzer, San Mateo, CA (US); Matteo Munaro, San Francisco, CA (US); Pavel Hanchar, Minsk (BY); Aidas Liaudanskas, San Francisco, CA (US); Krunal Ketan Chande, San Francisco, CA (US); Wook Yeon Hwang, San Francisco, CA (US); Blake McConnell, San Francisco, CA (US); Johan Nordin, San Francisco, CA (US); Rodrigo Ortiz-Cayon, San Francisco, CA (US); Ioannis Spanos, San Francisco, CA (US); Nick Stetco, San Francisco, CA (US); Milos Vlaski, San Francisco, CA (US); Martin Markus Hubert Wawro, San Francisco, CA (US); Endre Ajandi, San Francisco, CA (US); Santi Arano, San Francisco, CA (US); Mehjabeen Alim, Santa Clara, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

(21) Appl. No.: 17/525,683

(22) Filed: Nov. 12, 2021

(65) Prior Publication Data

US 2022/0155945 A1 May 19, 2022

Related U.S. Application Data

(60) Provisional application No. 63/114,975, filed on Nov. 17, 2020.

(51) Int. Cl.
| | |
|---|---|
| *G06F 3/04845* | (2022.01) |
| *G06F 3/04815* | (2022.01) |
| *G06V 20/64* | (2022.01) |

(52) U.S. Cl.
CPC ...... *G06F 3/04845* (2013.01); *G06F 3/04815* (2013.01); *G06V 20/64* (2022.01)

(58) Field of Classification Search
None
See application file for complete search history.

(56) References Cited

U.S. PATENT DOCUMENTS

| | | | | |
|---|---|---|---|---|
| 5,956,081 A | * | 9/1999 | Katz ..................... | H04N 7/181 |
| | | | | 348/E7.086 |
| 6,747,687 B1 | * | 6/2004 | Alves .................... | H04N 7/188 |
| | | | | 382/104 |

(Continued)

FOREIGN PATENT DOCUMENTS

| | | |
|---|---|---|
| KR | 20110036386 A | 4/2011 |
| WO | 2021001337 A1 | 1/2021 |
| WO | 2021151412 A1 | 8/2021 |

OTHER PUBLICATIONS

International Search Report and Written Opinion for App. No. PCT/US2021/059232, dated Mar. 7, 2022, 9 pages.

(Continued)

*Primary Examiner* — Mandrita Brahmachari
(74) *Attorney, Agent, or Firm* — Kwan & Olynick LLP

(57) ABSTRACT

Images may be captured from a plurality of cameras of an object moving along a path. Each of the cameras may be positioned at a respective identified location in three-dimensional space. Correspondence information for the plurality of images linking locations on different ones of the images may be determined. Linked locations may correspond to similar portions of the object captured by the cameras. A portion of the plurality of images may be presented on a display screen via a graphical user interface. The plurality of images may be grouped based on the correspondence information.

19 Claims, 27 Drawing Sheets
(10 of 27 Drawing Sheet(s) Filed in Color)

(56) References Cited

U.S. PATENT DOCUMENTS

| | | | | |
|---|---|---|---|---|
| 7,920,959 | B1* | 4/2011 | Williams | G08G 1/056 |
| | | | | 345/614 |
| 9,218,698 | B2 | 12/2015 | Ricci | |
| 9,495,764 | B1 | 11/2016 | Boardman | |
| 9,886,771 | B1* | 2/2018 | Chen | G06T 7/344 |
| 10,187,629 | B2 | 1/2019 | Cabral | |
| 10,319,094 | B1 | 6/2019 | Chen | |
| 10,373,260 | B1* | 8/2019 | Haller, Jr. | G06V 10/751 |
| 10,497,108 | B1 | 12/2019 | Knuffman | |
| 2002/0186300 | A1* | 12/2002 | Hudson | H04N 7/181 |
| | | | | 348/E7.086 |
| 2010/0056221 | A1* | 3/2010 | Park | G06F 3/04883 |
| | | | | 345/173 |
| 2011/0262028 | A1* | 10/2011 | Lipson | G06T 7/97 |
| | | | | 382/218 |
| 2011/0313936 | A1* | 12/2011 | Sieger | G06Q 10/083 |
| | | | | 705/306 |
| 2016/0283074 | A1* | 9/2016 | Drive | G06F 40/205 |
| 2017/0132835 | A1 | 5/2017 | Halliday | |
| 2018/0260793 | A1* | 9/2018 | Li | G06Q 40/08 |
| 2018/0293664 | A1 | 10/2018 | Zhang | |
| 2019/0043220 | A1 | 2/2019 | Kumar | |
| 2019/0095877 | A1 | 3/2019 | Li | |
| 2019/0096057 | A1 | 3/2019 | Allen | |
| 2019/0098214 | A1* | 3/2019 | Kurosawa | H04N 5/23245 |
| 2019/0135216 | A1* | 5/2019 | Church | G08G 1/165 |
| 2019/0189007 | A1* | 6/2019 | Herman | G08G 1/0133 |
| 2019/0335156 | A1* | 10/2019 | Rusu | G06F 3/04842 |
| 2020/0050890 | A1* | 2/2020 | Aizawa | G06V 10/82 |
| 2020/0111203 | A1 | 4/2020 | Tan | |
| 2020/0234488 | A1 | 7/2020 | Holzer | |
| 2020/0257862 | A1 | 8/2020 | Kar | |
| 2020/0322545 | A1 | 10/2020 | Magnuszewski | |
| 2020/0349757 | A1 | 11/2020 | Holzer | |
| 2021/0058547 | A1 | 2/2021 | Puttamalla et al. | |
| 2021/0176435 | A1* | 6/2021 | Krüger | G06F 3/0484 |
| 2021/0329221 | A1 | 10/2021 | Arbabian | |
| 2021/0342997 | A1 | 11/2021 | Malreddy | |
| 2022/0155945 | A1 | 5/2022 | Holzer | |
| 2022/0254008 | A1 | 8/2022 | Holzer | |

OTHER PUBLICATIONS

International Search Report and Written Opinion for App. No. PCT/US2021/059222, dated Feb. 24, 2022, 10 pages.
International Search Report and Written Opinion issued in App. No. PCT/US2022/070489, mailing date Apr. 26, 2022, 11 pages.
Office Action (Non-Final Rejection) dated Mar. 2, 2023 for U.S. Appl. No. 17/525,657 (pp. 1-12).
International Preliminary Report on Patentability issued in App. No. PCT/US2021/059222, mailing date Jun. 1, 2023, 6 pages.
International Preliminary Report on Patentability issued in App. No. PCT/US2021/059232, mailing date Jun. 1, 2023, 6 pages.
Office Action (Notice of Allowance and Fees Due (PTOL-85)) dated Aug. 21, 2023 for U.S. Appl. No. 17/525,657 (pp. 1-7).
Office Action (Non-Final Rejection) dated Apr. 30, 2024 for U.S. Appl. No. 17/649,793 (pp. 1-14), available via Patent Center.
Office Action (Non-Final Rejection) dated May 9, 2024 for U.S. Appl. No. 17/649,792 (pp. 1-20).
Office Action (Non-Final Rejection) dated Jun. 6, 2024 for U.S. Appl. No. 18/511,820 (pp. 1-14).
U.S. Appl. No. 17/649,793, USPTO e-Office Action: CTFR—Final Rejection, Jul. 11, 2025, 9 pages, Available Via Patent Center.
Office Action (Final Rejection) dated Aug. 28, 2024 for U.S. Appl. No. 17/649,793 (pp. 1-12).
Office Action (Notice of Allowance and Fees Due (PTOL-85)) dated Nov. 13, 2024 for U.S. Appl. No. 17/649,792 (pp. 1-7).
Office Action (Final Rejection) dated Aug. 22, 2024 for U.S. Appl. No. 17/649,792 (pp. 1-22).
Office Action (Non-Final Rejection) dated Mar. 31, 2025 for U.S. Appl. No. 17/649,793 (pp. 1-12).
U.S. Appl. No. 17/649,793, USPTO e-Office Action: CTNF—Non-Final Rejection, Nov. 26, 2025, 11 pages.
Office Action, Israel Patent Application No. 302384, mailed Dec. 20, 2025, 2 pages.

* cited by examiner

1302

1304

Gate Results Page

Undercarriage

Damage multi-view close-up

Damage multi-view close-up

Damage multi-view close-up

Damage multi-view close-up

2706

2702

2708

2704

DAMAGE DETECTION PORTAL

CROSS-REFERENCE TO RELATED APPLICATIONS

This application claims priority to provisional U.S. Patent Application 63/114,975, filed by Holzer et al. on Nov. 17, 2020, which is hereby incorporated by reference in its entirety and for all purposes.

COPYRIGHT NOTICE

TECHNICAL FIELD

The present disclosure relates generally to the capture and presentation of image data of an object, and more specifically to detecting damage to objects.

DESCRIPTION OF RELATED ART

Vehicles need to be inspected for damage on different occasions. For example, a vehicle may be inspected after an accident to evaluate or support an insurance claim or police report. As another example, a vehicle may be inspected before and after the rental of a vehicle, or before buying or selling a vehicle.

Vehicle inspection using conventional approaches is a largely manual process. Typically, a person walks around the vehicle and manually notes damage and conditions. This process is time-intensive, resulting in significant costs. The manual inspection results also vary based on the person. For example, a person may be more or less experienced in evaluating damage. The variation in results can yield a lack of trust and potential financial losses, for example when buying and selling vehicles or when evaluating insurance claims.

Overview

Techniques and mechanisms described herein include methods, systems, devices, and machine-readable media having instructions stored thereon relate to the collection and processing of image data. According to various embodiments, a plurality of images from a plurality of cameras of an object moving along a path may be captured. Each of the cameras may be positioned at a respective identified location in three-dimensional space. Correspondence information for the plurality of images linking locations on different ones of the images may be determined. Linked locations may correspond to similar portions of the object captured by the cameras. A portion of the plurality of images may be presented on a display screen via a graphical user interface. The plurality of images may be grouped based on the correspondence information.

According to various embodiments, the object motion may be determined based on the plurality of images and the identified locations. The correspondence information for the plurality of images may be determined at least in part based on the object motion. The correspondence information may be determined by constructing a three-dimensional model of the object based at least in part on the plurality of images and the identified locations.

According to various embodiments, damage to the object may be detected based on the plurality of images. The damage to the object may be detected by applying a neural network to one or more of the plurality of images. The portion of the plurality of images may include images that include the detected damage. The graphical user interface displaying a portion of the plurality of images may include a heat map indicating the detected damage.

According to various embodiments, some or all of the plurality of cameras may be positioned on one or more rigid structures. For example, the structure may be positioned over a roadway, and the object captured may be a vehicle driven along the roadway.

According to various embodiments, the object may be detected based on image data captured from one or more of the plurality of cameras. The plurality of images may be captured when the object is detected. The plurality of cameras may include an undercarriage camera configured to capture one or more images from beneath the object. The portion of the plurality of images may be navigable in one or more dimensions.

BRIEF DESCRIPTION OF DRAWINGS

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

TECHNICAL DESCRIPTION

According to various embodiments, techniques and mechanisms described herein may be used to identify and represent damage to an object such as a vehicle. The damage detection techniques may be employed by untrained individuals. For example, an individual may collect multi-view data of an object, and the system may detect the damage automatically.

According to various embodiments, various types of damage may be detected. For a vehicle, such data may include, but is not limited to: one or more scratches, dents, flat tires, cracked glass, broken glass, manufacturing imperfections, deviations from expectation for some other reason, chips, imperfection caused due to weather (e.g., rain, snow, sun, salt, humidity), imperfection caused by striking or being struck (e.g., by an object, person, animal, or part of the object itself).

In some implementations, a user may be guided to collect multi-view data in a manner that reflects the damage detection process. For example, when the system detects that damage may be present, the system may guide the user to take additional images of the portion of the object that is damaged.

According to various embodiments, techniques and mechanisms described herein may be used to create damage estimates that are consistent over multiple captures. In this way, damage estimates may be constructed in a manner that is independent of the individual wielding the camera and does not depend on the individual's expertise. In this way, the system can automatically detect damage in an instant, without requiring human intervention.

Although various techniques and mechanisms are described herein by way of example with reference to detecting damage to vehicles, these techniques and mechanisms are widely applicable to detecting damage to a range of objects. Such objects may include, but are not limited to: houses, apartments, hotel rooms, real property, personal property, equipment, jewelry, furniture, offices, people, and animals.

Figure 1:
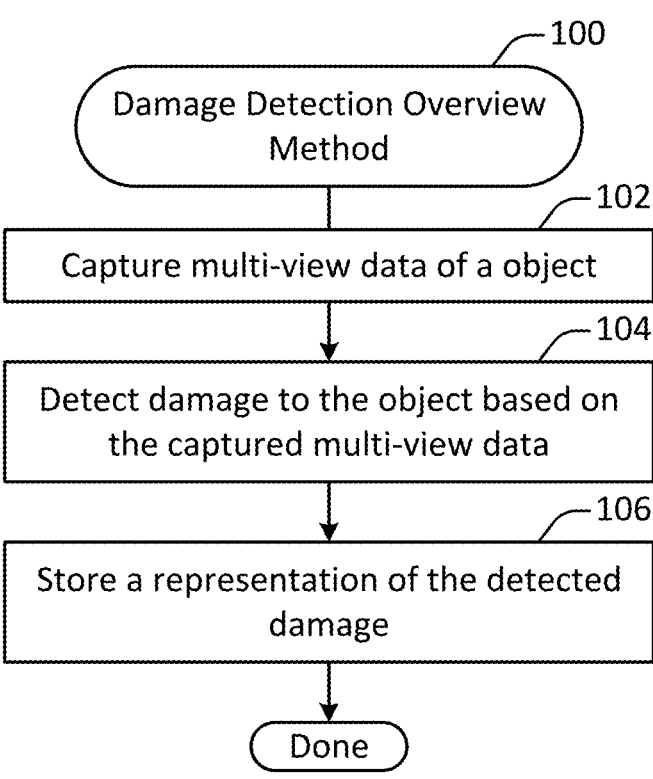
FIG. 1 illustrates a method for damage detection, performed in accordance with one or more embodiments.

FIG. 1 illustrates a method 100 for damage detection, performed in accordance with one or more embodiments. According to various embodiments, the method 100 may be performed at a damage detection portal or computing device in communication with a damage detection portal. Alternately, or additionally, some or all of the method 100 may be performed at a remote computing device such as a server. The method 100 may be used to detect damage to any of various types of objects. However, for the purpose of illustration, many examples discussed herein will be described with reference to vehicles.

According to various embodiments, as used herein the term "portal" may refer to a variety of structural configurations in which one or more cameras are used to capture visual image data of an object. For example, the portal may be configured as a fixed structure through which an object passes or in which an object is positioned in a stationary manner. As another example, the portal may be configured as a mechanical arm on which fixed cameras are mounted, where the mechanical arm can move around an object. As yet another example, the portal may be configured as a fixed structure that is rotated around an object or in which an object is rotated around.

At 102, multi-view data of an object is captured. According to various embodiments, the multi-view data may include images captured from different viewpoints. For example, a user may walk around a vehicle and capture images from different angles. In some configurations, the multi-view data may include data from various types of sensors. For example, the multi-view data may include data from more than one camera. As another example, the multi-view data may include data from a depth sensor. As another example, the multi-view data may include data collected from an inertial measurement unit (IMU). IMU data may include position information, acceleration information, rotation information, or other such data collected from one or more accelerometers or gyroscopes.

In particular embodiments, the multi-view data may be aggregated to construct a multi-view representation. Additional details regarding multi-view data and damage detection are discussed in co-pending and commonly assigned U.S. patent application Ser. No. 16/692,133, "DAMAGE DETECTION FROM MULTI-VIEW VISUAL DATA", by Holzer et al., filed Nov. 22, 2019, which is hereby incorporated by reference in its entirety and for all purposes.

At 104, damage to the object is detected based on the captured multi-view data. In some implementations, the damage may be detected by evaluating some or all of the multi-view data with a neural network, by comparing some or all of the multi-view data with reference data, and/or any other relevant operations for damage detection. Additional details regarding damage detection are discussed throughout the application.

At 106, a representation of the detected damage is stored on a storage medium or transmitted via a network. According to various embodiments, the representation may include some or all of a variety of information. For example, the representation may include an estimated dollar value. As another example, the representation may include a visual depiction of the damage. As still another example, a list of damaged parts may be provided. Alternatively, or additionally, the damaged parts may be highlighted in a 3D CAD model.

In some embodiments, a visual depiction of the damage may include an image of actual damage. For example, once the damage is identified at 104, one or more portions of the multi-view data that include images of the damaged portion of the object may be selected and/or cropped.

In some implementations, a visual depiction of the damage may include an abstract rendering of the damage. An abstract rendering may include a heatmap that shows the probability and/or severity of damage using a color scale. Alternatively, or additionally, an abstract rendering may represent damage using a top-down view or other transformation. By presenting damage on a visual transformation of the object, damage (or lack thereof) to different sides of the object may be presented in a standardized manner.

Figure 2:
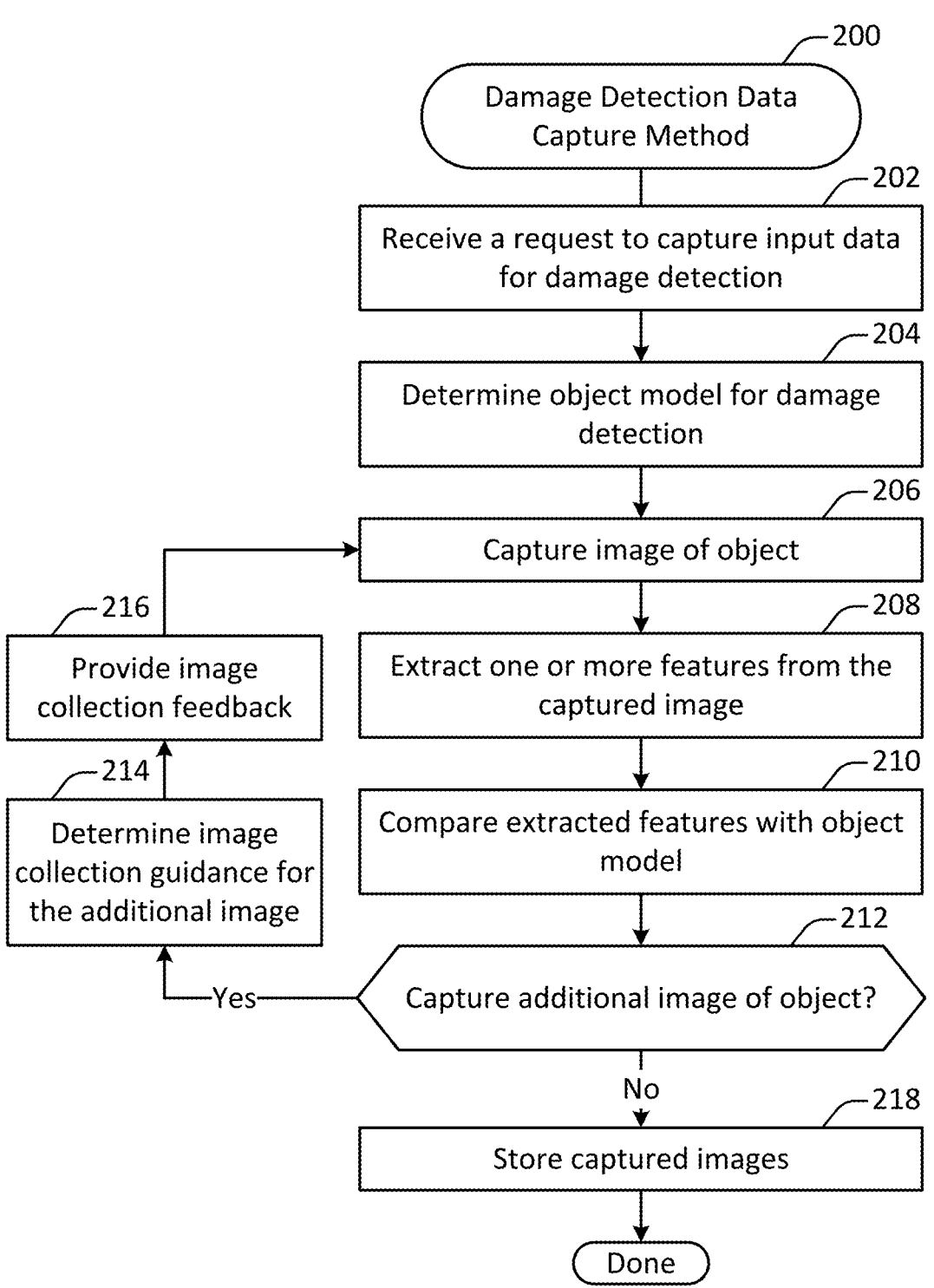
FIG. 2 illustrates a method of damage detection data capture, performed in accordance with one or more embodiments.

FIG. 2 illustrates a method 200 of damage detection data capture, performed in accordance with one or more embodiments. According to various embodiments, the method 200 may be performed at a damage detection portal or computing device in communication with a damage detection portal. The method 200 may be used to detect damage to any of various types of objects. However, for the purpose of illustration, many examples discussed herein will be described with reference to vehicles.

A request to capture input data for damage detection for an object is received at 202. In some implementations, the request to capture input data may be received at a damage detection portal or computing device in communication with a damage detection portal. In particular embodiments, the object may be a vehicle such as a car, truck, or sports utility vehicle.

An object model for damage detection is determined at 204. According to various embodiments, the object model may include reference data for use in evaluating damage and/or collecting images of an object. For example, the object model may include one or more reference images of similar objects for comparison. As another example, the object model may include a trained neural network. As yet another example, the object model may include one or more reference images of the same object captured at an earlier point in time. As yet another example, the object model may include a 3D model (such as a CAD model) or a 3D mesh reconstruction of the corresponding vehicle.

In some embodiments, the object model may be determined based on user input. For example, the user may identify a vehicle in general or a car, truck, or sports utility vehicle in particular as the object type.

In some implementations, the object model may be determined automatically based on data captured as part of the method 200. In this case, the object model may be determined after the capturing of one or more images at 206.

At 206, an image of the object is captured. According to various embodiments, capturing the image of the object may involve receiving data from one or more of various sensors. Such sensors may include, but are not limited to, one or more cameras, depth sensors, accelerometers, and/or gyroscopes. The sensor data may include, but is not limited to, visual data, motion data, and/or orientation data. In some configurations, more than one image of the object may be captured. Alternatively, or additionally, video footage may be captured.

According to various embodiments, a camera or other sensor located at a computing device may be communicably coupled with the computing device in any of various ways. For example, in the case of a mobile phone or laptop, the camera may be physically located within the computing device. As another example, in some configurations a camera or other sensor may be connected to the computing device via a cable. As still another example, a camera or other sensor may be in communication with the computing device via a wired or wireless communication link.

According to various embodiments, as used herein the term "depth sensor" may be used to refer to any of a variety of sensor types that may be used to determine depth information. For example, a depth sensor may include a projector and camera operating in infrared light frequencies. As another example, a depth sensor may include a projector and camera operating in visible light frequencies. For instance, a line-laser or light pattern projector may project a visible light pattern onto an object or surface, which may then be detected by a visible light camera.

One or more features of the captured image or images are extracted at 208. In some implementations, extracting one or more features of the object may involve constructing a multi-view capture that presents the object from different viewpoints. If a multi-view capture has already been constructed, then the multi-view capture may be updated based on the new image or images captured at 206. Alternatively, or additionally, feature extraction may involve performing one or more operations such as object recognition, component identification, orientation detection, or other such steps.

At 210, the extracted features are compared with the object model. According to various embodiments, comparing the extracted features to the object model may involve making any comparison suitable for determining whether the captured image or images are sufficient for performing damage comparison. Such operations may include, but are not limited to: applying a neural network to the captured image or images, comparing the captured image or images to one or more reference images, and/or performing any of the operations discussed with respect to FIGS. 3 and 4.

A determination is made at 212 as to whether to capture an additional image of the object. In some implementations, the determination may be made at least in part based on an analysis of the one or more images that have already been captured.

In some embodiments, a preliminary damage analysis may be implemented using as input the one or more images that have been captured. If the damage analysis is inconclusive, then an additional image may be captured. Techniques for conducting damage analysis are discussed in additional detail with respect to the methods 300 and 400 shown in FIGS. 3 and 4.

In some embodiments, the system may analyze the captured image or images to determine whether a sufficient portion of the object has been captured in sufficient detail to support damage analysis. For example, the system may analyze the capture image or images to determine whether the object is depicted from all sides. As another example, the system may analyze the capture image or images to determine whether each panel or portion of the object is shown in a sufficient amount of detail. As yet another example, the system may analyze the capture image or images to determine whether each panel or portion of the object is shown from a sufficient number of viewpoints.

If the determination is made to capture an additional image, then at 214 image collection guidance for capturing the additional image is determined. In some implementations, the image collection guidance may include any suitable instructions for capturing an additional image that may assist in changing the determination made at 212. Such guidance may include an indication to capture an additional image from a targeted viewpoint, to capture an additional image of a designated portion of the object, or to capture an additional image at a different level of clarity or detail. For example, if possible damage is detected, then feedback may be provided to capture additional detail at the damaged location.

At 216, image collection feedback is provided. According to various embodiments, the image collection feedback may include any suitable instructions or information for assisting a user in collecting additional images. Such guidance may include, but is not limited to, instructions to collect an image at a targeted camera position, orientation, or zoom level. Alternatively, or additionally, a user may be presented with instructions to capture a designated number of images or an image of a designated portion of the object.

For example, a user may be presented with a graphical guide to assist the user in capturing an additional image from a target perspective. As another example, a user may be presented with written or verbal instructions to guide the user in capturing an additional image.

When it is determined to not capture an additional image of the object, then at 218 the captured image or images are stored. In some implementations, the captured images may be stored on a storage device and used to perform damage detection, as discussed with respect to the methods 300 and 400 in FIGS. 3 and 4. Alternatively, or additionally, the images may be transmitted to a remote location via a network interface.

Figure 3:
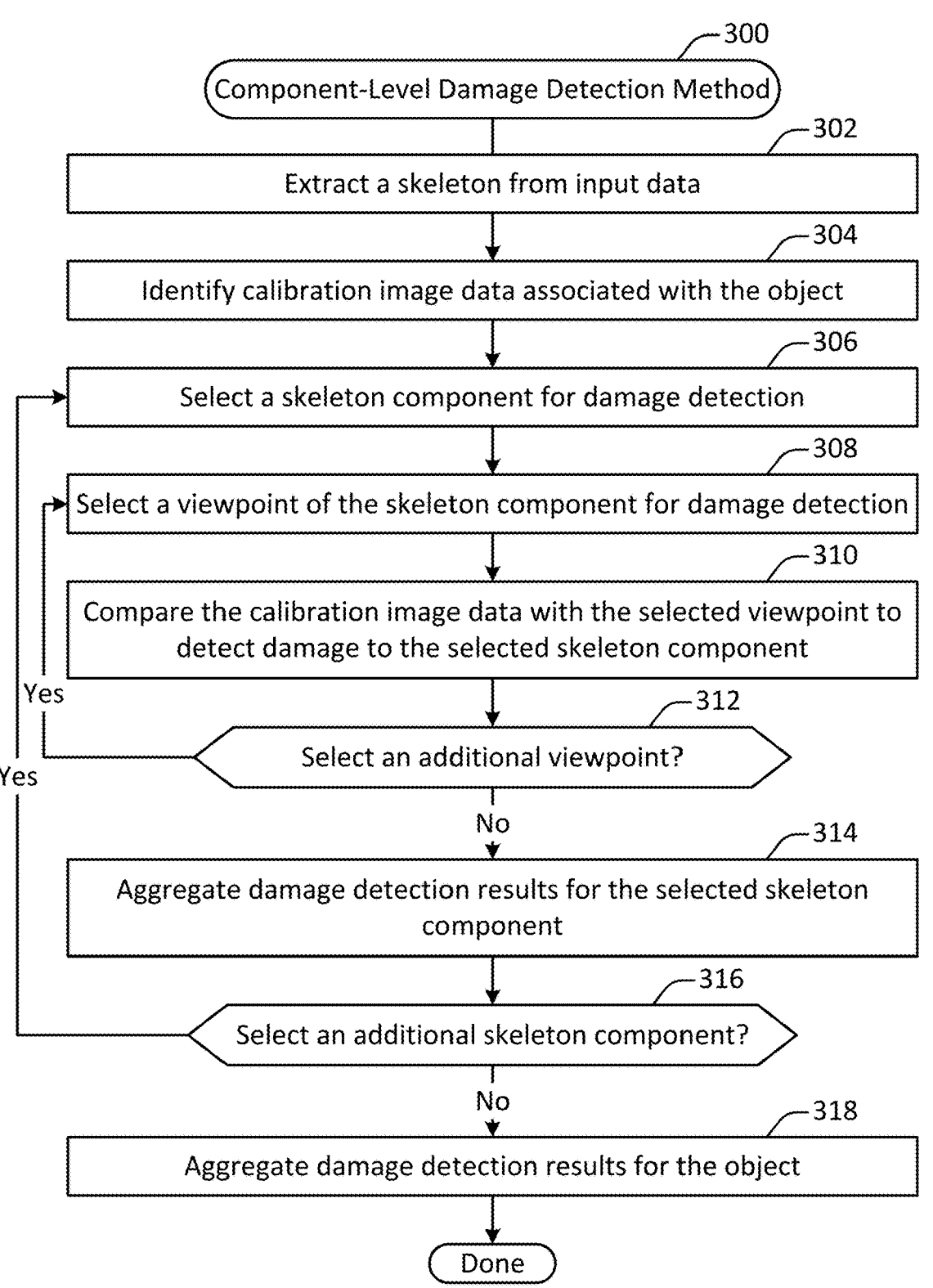
FIG. 3 illustrates a method for component-level damage detection, performed in accordance with one or more embodiments.

FIG. 3 illustrates a method 300 for component-level damage detection, performed in accordance with one or more embodiments. According to various embodiments, the method 300 may be performed at a damage detection portal or computing device in communication with a damage detection portal. The method 300 may be used to detect damage to any of various types of objects. However, for the purpose of illustration, many examples discussed herein will be described with reference to vehicles.

A skeleton is extracted from input data at 302. According to various embodiments, the input data may include visual data collected as discussed with respect to the method 300 shown in FIG. 3. Alternatively, or additionally, the input data may include previously collected visual data, such as visual data collected without the use of recording guidance.

In some implementations, the input data may include one or more images of the object captured from different perspectives. Alternatively, or additionally, the input data may include video data of the object. In addition to visual data, the input data may also include other types of data, such as IMU data.

According to various embodiments, skeleton detection may involve one or more of a variety of techniques. Such techniques may include, but are not limited to: 2D skeleton detection using machine learning, 3D pose estimation, and 3D reconstruction of a skeleton from one or more 2D skeletons and/or poses.

Calibration image data associated with the object is identified at 304. According to various embodiments, the calibration image data may include one or more reference images of similar objects or of the same object at an earlier point in time. Alternatively, or additionally, the calibration image data may include a neural network used to identify damage to the object.

A skeleton component is selected for damage detection at 306. In some implementations, a skeleton component may represent a panel of the object. In the case of a vehicle, for example, a skeleton component may represent a door panel, a window, or a headlight. Skeleton components may be selected in any suitable order, such as sequentially, randomly, in parallel, or by location on the object.

According to various embodiments, when a skeleton component is selected for damage detection, a multi-view capture of the skeleton component may be constructed. Constructing a multi-view capture of the skeleton component may involve identifying different images in the input data that capture the skeleton component from different viewpoints. The identified images may then be selected, cropped, and combined to produce a multi-view capture specific to the skeleton component.

A viewpoint of the skeleton component is selected for damage detection at 304. In some implementations, each viewpoint included in the multi-view capture of the skeleton component may be analyzed independently. Alternatively, or additionally, more than one viewpoint may be analyzed simultaneously, for instance by providing the different viewpoints as input data to a machine learning model trained to identify damage to the object. In particular embodiments, the input data may include other types of data, such as 3D visual data or data captured using a depth sensor or other type of sensor.

According to various embodiments, one or more alternatives to skeleton analysis at 302-310 may be used. For example, an object part (e.g., vehicle component) detector may be used to directly estimate the object parts. As another example, an algorithm such as a neural network may be used to map an input image to a top-down view of an object such as a vehicle (and vice versa) in which the components are defined. As yet another example, an algorithm such as a neural network that classifies the pixels of an input image as a specific component can be used to identify the components. As still another example, component-level detectors may be used to identify specific components of the object. As yet another alternative, a 3D reconstruction of the vehicle may be computed and a component classification algorithm may be run on that 3D model. The resulting classification can then be back-projected into each image. As still another alternative, a 3D reconstruction of the vehicle can be computed and fitted to an existing 3D CAD model of the vehicle in order to identify the single components.

At 310, the calibration image data is compared with the selected viewpoint to detect damage to the selected skeleton component. According to various embodiments, the comparison may involve applying a neural network to the input data. Alternatively, or additionally, an image comparison between the selected viewpoint and one or more reference images of the object captured at an earlier point in time may be performed.

A determination is made at 312 as to whether to select an additional viewpoint for analysis. According to various embodiments, additional viewpoints may be selected until all available viewpoints are analyzed. Alternatively, viewpoints may be selected until the probability of damage to the selected skeleton component has been identified to a designated degree of certainty.

Damage detection results for the selected skeleton component are aggregated at 314. According to various embodiments, damage detection results from different viewpoints to a single damage detection result per panel resulting in a damage result for the skeleton component. For example, a heatmap may be created that shows the probability and/or severity of damage to a vehicle panel such as a vehicle door. According to various embodiments, various types of aggregation approaches may be used. For example, results determined at 310 for different viewpoints may be averaged. As another example, different results may be used to "vote" on a common representation such as a top-down view. Then, damage may be reported if the votes are sufficiently consistent for the panel or object portion.

A determination is made at 316 as to whether to select an additional skeleton component for analysis. In some implementations, additional skeleton components may be selected until all available skeleton components are analyzed.

Damage detection results for the object are aggregated at 314. According to various embodiments, damage detection results for different components may be aggregated into a single damage detection result for the object as a whole. For example, creating the aggregated damage results may involve creating a top-down view. As another example, creating the aggregated damage results may involve identifying standardized or appropriate viewpoints of portions of the object identified as damaged. As yet another example, creating the aggregated damage results may involve tagging damaged portions in a multi-view representation. As still another example, creating the aggregated damage results may involve overlaying a heatmap on a multi-view representation. As yet another example, creating the aggregated damage results may involve selecting affected parts and presenting them to the user. Presenting may be done as a list, as highlighted elements in a 3D CAD model, or in any other suitable fashion.

In particular embodiments, techniques and mechanisms described herein may involve a human to provide additional input. For example, a human may review damage results, resolve inconclusive damage detection results, or select damage result images to include in a presentation view. As another example, human review may be used to train one or more neural networks to ensure that the results computed are correct and are adjusted as necessary.

Figure 4:
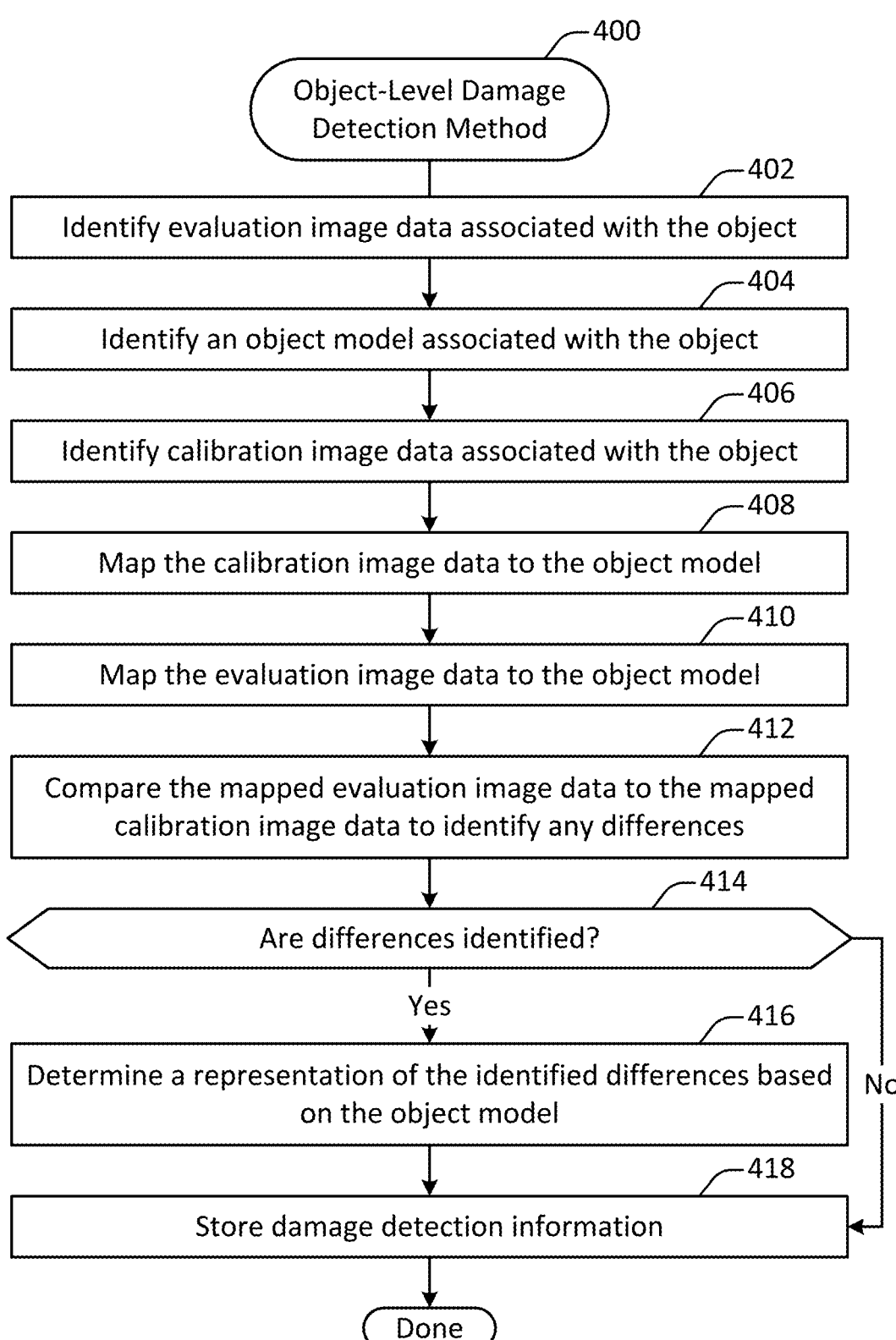
FIG. 4 illustrates an object-level damage detection method, performed in accordance with one or more embodiments.

FIG. 4 illustrates an object-level damage detection method 400, performed in accordance with one or more embodiments. The method 400 may be performed at a damage detection portal or computing device in communication with a damage detection portal. The method 400 may be used to detect damage to any of various types of objects.

Evaluation image data associated with the object is identified at 402. According to various embodiments, the evaluation image data may include single images captured from different viewpoints. As discussed herein, the single images may be aggregated into a multi-view capture, which may include data other than images, such as IMU data.

An object model associated with the object is identified at 404. In some implementations, the object model may include a 2D or 3D standardized mesh, model, or abstracted representation of the object. For instance, the evaluation image data may be analyzed to determine the type of object that is represented. Then, a standardized model for that type of object may be retrieved. Alternatively, or additionally, a user may select an object type or object model to use. The object model may include a top-down view of the object.

Calibration image data associated with the object is identified at 406. According to various embodiments, the calibration image data may include one or more reference images. The reference images may include one or more images of the object captured at an earlier point in time. Alternatively, or additionally, the reference images may include one or more images of similar objects. For example, a reference image may include an image of the same type of car as the car in the images being analyzed.

In some implementations, the calibration image data may include a neural network trained to identify damage. For instance, the calibration image data may be trained to analyze damage from the type of visual data included in the evaluation data.

The calibration data is mapped to the object model at 408. In some implementations, mapping the calibration data to the object model may involve mapping a perspective view of an object from the calibration images to a top-down view of the object.

The evaluation image data is mapped to the object model at 410. In some implementations, mapping the evaluation image data to the object model may involve determine a pixel-by-pixel correspondence between the pixels of the image data and the points in the object model. Performing such a mapping may involve determining the camera position and orientation for an image from IMU data associated with the image.

In some embodiments, a dense per-pixel mapping between an image and the top-down view may be estimated at 410. Alternatively, or additionally, location of center of an image may be estimated with respect to the top-down view. For example, a machine learning algorithm such as deep net may be used to map the image pixels to coordinates in the top-down view. As another example, joints of a 3D skeleton of the object may be estimated and used to define the mapping. As yet another example, component-level detectors may be used to identify specific components of the object.

In some embodiments, the location of one or more object parts within the image may be estimated. Those locations may then be used to map data from the images to the top-down view. For example, object parts may be classified on a pixel-wise basis. As another example, the center location of object parts may be determined. As another example, the joints of a 3D skeleton of an object may be estimated and used to define the mapping. As yet another example, component-level detectors may be used for specific object components.

In some implementations, images may be mapped in a batch via a neural network. For example, a neural network may receive as input a set of images of an object captured from different perspectives. The neural network may then detect damage to the object as a whole based on the set of input images.

The mapped evaluation image data is compared to the mapped calibration image data at 412 to identify any differences. According to various embodiments, the data may be compared by running a neural network on a multi-view representation as a whole. Alternatively, or additional, the evaluation and image data may be compared on an image-by-image basis.

If it is determined at 414 that differences are identified, then at 416 a representation of the identified differences is determined. According to various embodiments, the representation of the identified differences may involve a heatmap of the object as a whole. For example, a heatmap of a top-down view of a vehicle showing damage is illustrated in FIG. 2. Alternatively, one or more components that are damaged may be isolated and presented individually.

At 418, a representation of the detected damage is stored on a storage medium or transmitted via a network. In some implementations, the representation may include an estimated dollar value. Alternatively, or additionally, the representation may include a visual depiction of the damage. Alternatively, or additionally, affected parts may be presented as a list and/or highlighted in a 3D CAD model.

In particular embodiments, damage detection of an overall object representation may be combined with damage representation on one or more components of the object. For example, damage detection may be performed on a closeup of a component if an initial damage estimation indicates that damage to the component is likely.

Figure 5:
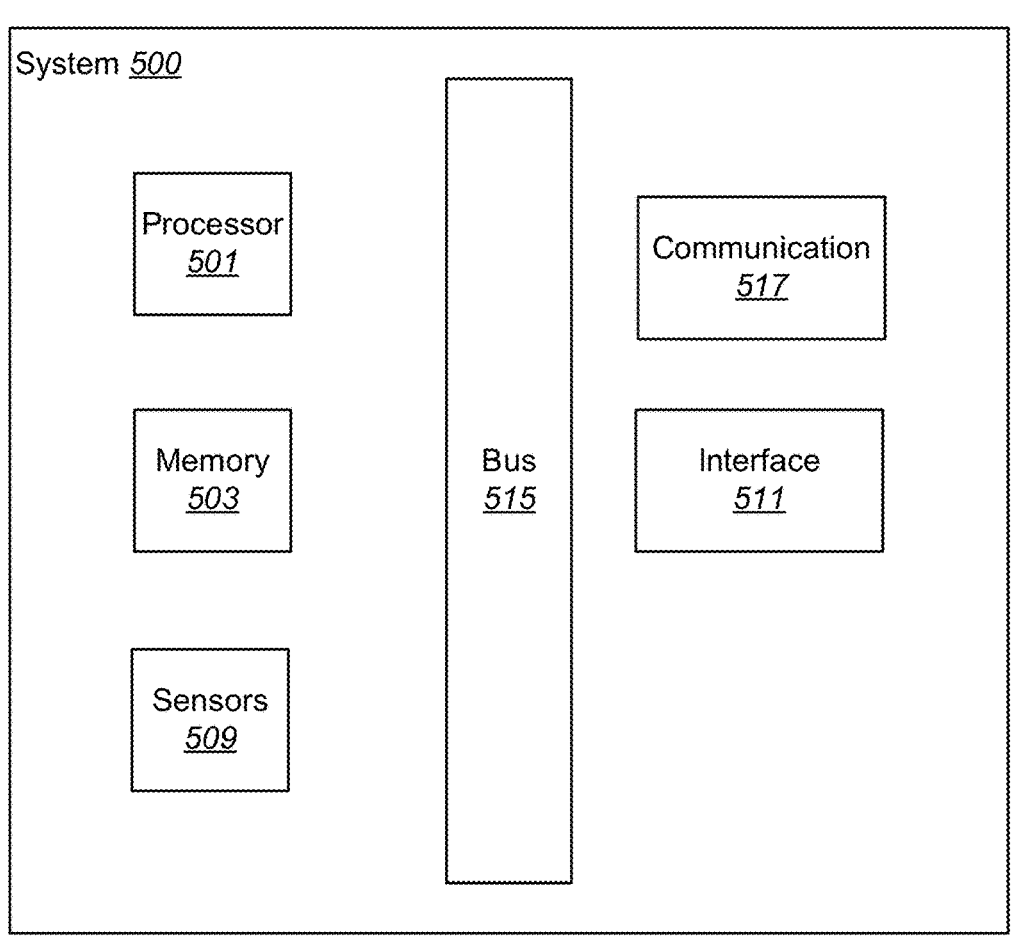
FIG. 5 illustrates a computer system configured in accordance with one or more embodiments.

FIG. 5 illustrates a computer system configured in accordance with one or more embodiments. For instance, the computer system 500 can be used to provide MVIDMRs according to various embodiments described above. According to various embodiments, a system 500 suitable for implementing particular embodiments includes a processor 501, a memory 503, an interface 511, and a bus 515 (e.g., a PCI bus).

The system 500 can include one or more sensors 509, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 5, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

The interface 511 may include separate input and output interfaces, or may be a unified interface supporting both operations. Examples of input and output interfaces can include displays, audio devices, cameras, touch screens, buttons and microphones. When acting under the control of appropriate software or firmware, the processor 501 is responsible for such tasks such as optimization. Various specially configured devices can also be used in place of a processor 501 or in addition to processor 501, such as graphical processor units (GPUs). The complete implementation can also be done in custom hardware. The interface 511 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 500 uses memory 503 to store data and program instructions and maintained a local side cache. The program instructions may control the operation of an operating system and/or one or more applications, for example. The memory or memories may also be configured to store received metadata and batch requested metadata.

The system 500 can be integrated into a single device with a common housing. For example, system 500 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 500 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Figure 6:
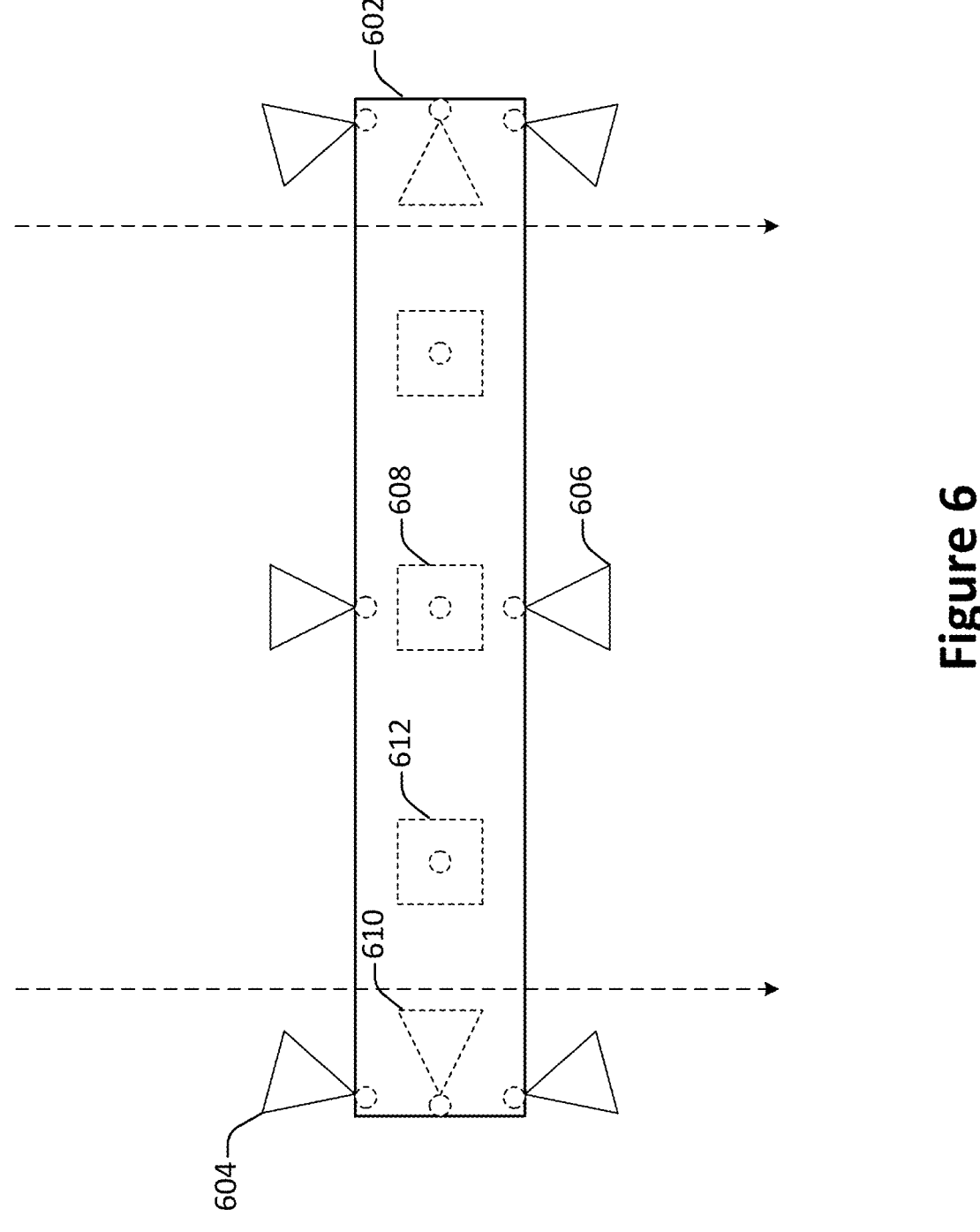
FIG. 6 shows a top-down diagram of a damage detection portal arranged as a gate, configured in accordance with one or more embodiments.
Figure 7:
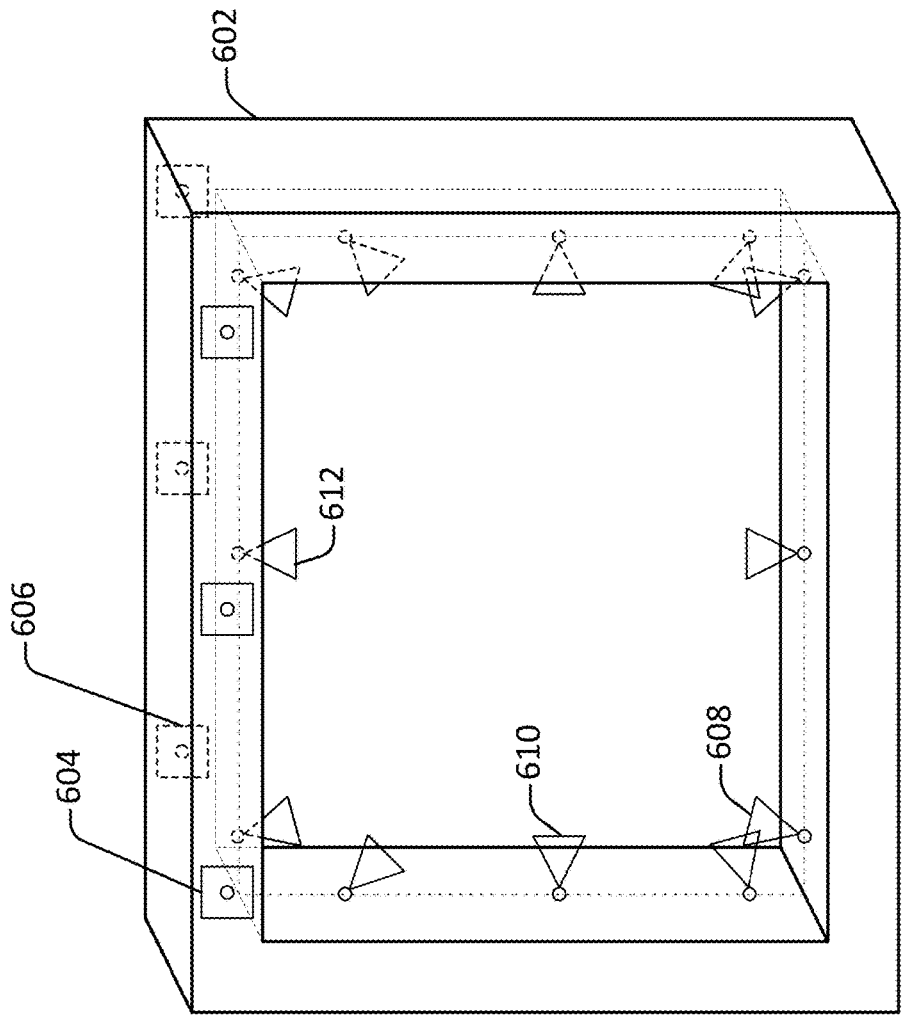
FIG. 7 shows a perspective diagram a damage detection portal, configured in accordance with one or more embodiments.

FIG. 6 shows a top-down diagram of a damage detection portal 602 arranged as a gate, configured in accordance with one or more embodiments. FIG. 7 shows a perspective diagram a damage detection portal 602, configured in accordance with one or more embodiments. The damage detection portal 602 is configured as a gate through which a vehicle may be driven. The damage detection portal 602 includes a number of cameras, such as the cameras 604, 606, 608, and 610. The camera 604 is configured to point toward the front as the vehicle drives through the gate. The camera 606 is configured to point toward the back as the vehicle leaves the gate. The camera 610 is configured to point toward the interior area of the gate. The camera 608 is configured to point down toward the top of the vehicle. The camera 612 is configured to point up toward the undercarriage of the vehicle. Various configurations of cameras are possible.

In particular embodiments, an image of a vehicle, for instance an image of the vehicle's undercarriage, may be created from two or more images captured by one, two, or more cameras. For example, the vehicle may be driven over two or more undercarriage cameras, which may each capture images of a portion of the vehicle's undercarriage. Those images may then be combined to yield a more complete image of the vehicle's undercarriage, for example, by including portions of the undercarriage that are not visible at the same time to a single camera.

In particular embodiments, an image of a vehicle may be created in an interactive fashion. For example, by creating an image of a vehicle's undercarriage based on different images captured with multiple cameras, a user may be able to change the view direction and look behind portions of the undercarriage by switching to a camera with a different view. As another example, one or more cameras may be movable, for instance by being mounted on a track and/or gimbal. In this way, the system may allow a camera to be repositioned to attain a different viewpoint, for instance to look behind an object in the undercarriage.

In particular embodiments, two or more of the cameras associated with the damage detection portal 602 may be synchronized. When cameras are synchronized, they may be configured to capture images at the same time or at nearly the same time. Alternatively, or additionally, synchronized cameras may be configured to capture images that are staggered in time by a fixed time period. By employing synchronized cameras, the images captured from the cameras may be more easily linked. For instance, synchronizing cameras on the left and right side of the damage detection portal may ensure that in a given image precisely the same portion of the vehicle is captured on the right side as by the corresponding camera on the left side.

Figure 8:
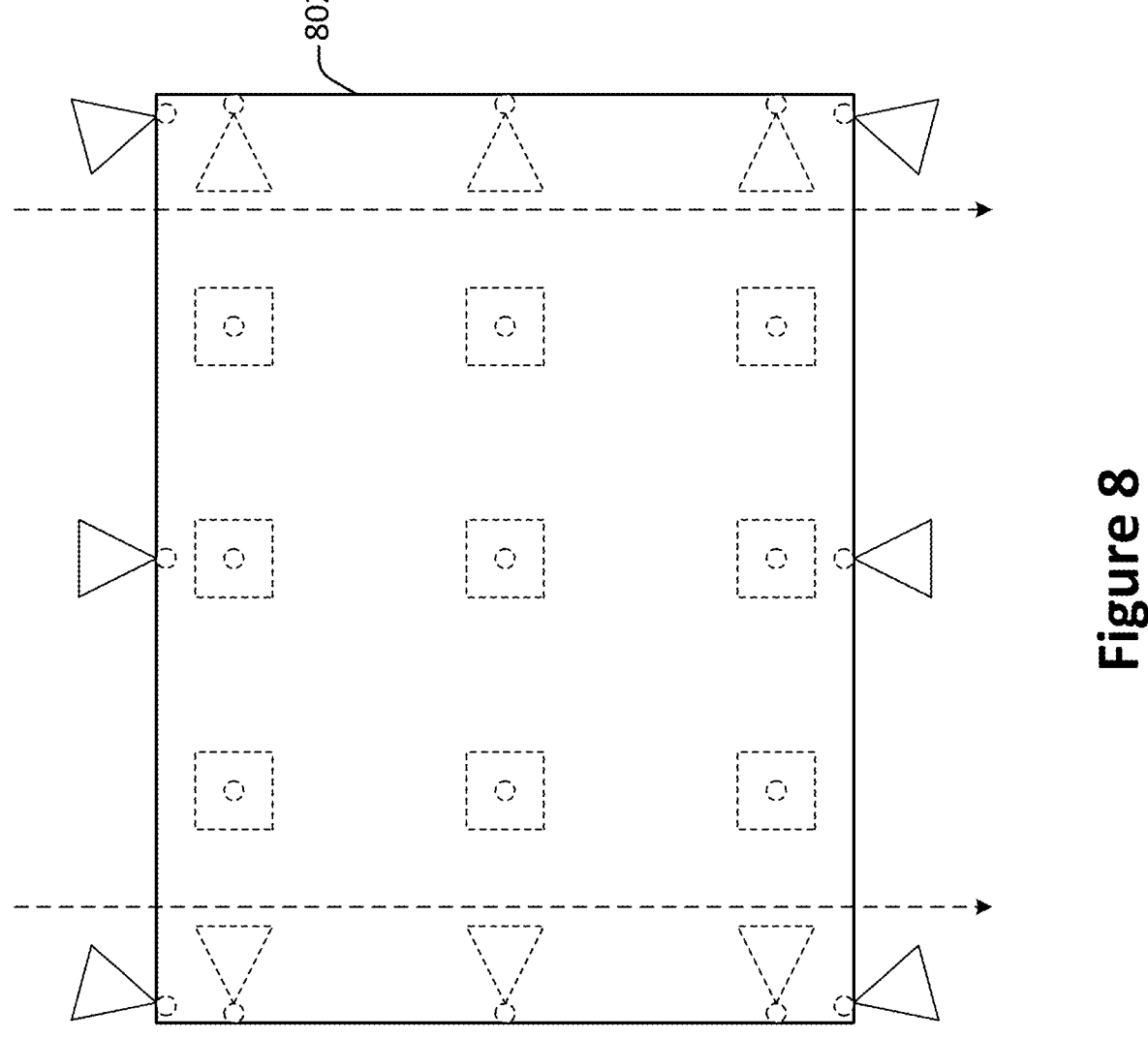
FIG. 8 shows a top-down diagram of a damage detection portal arranged as a tunnel, configured in accordance with one or more embodiments.
Figure 9:
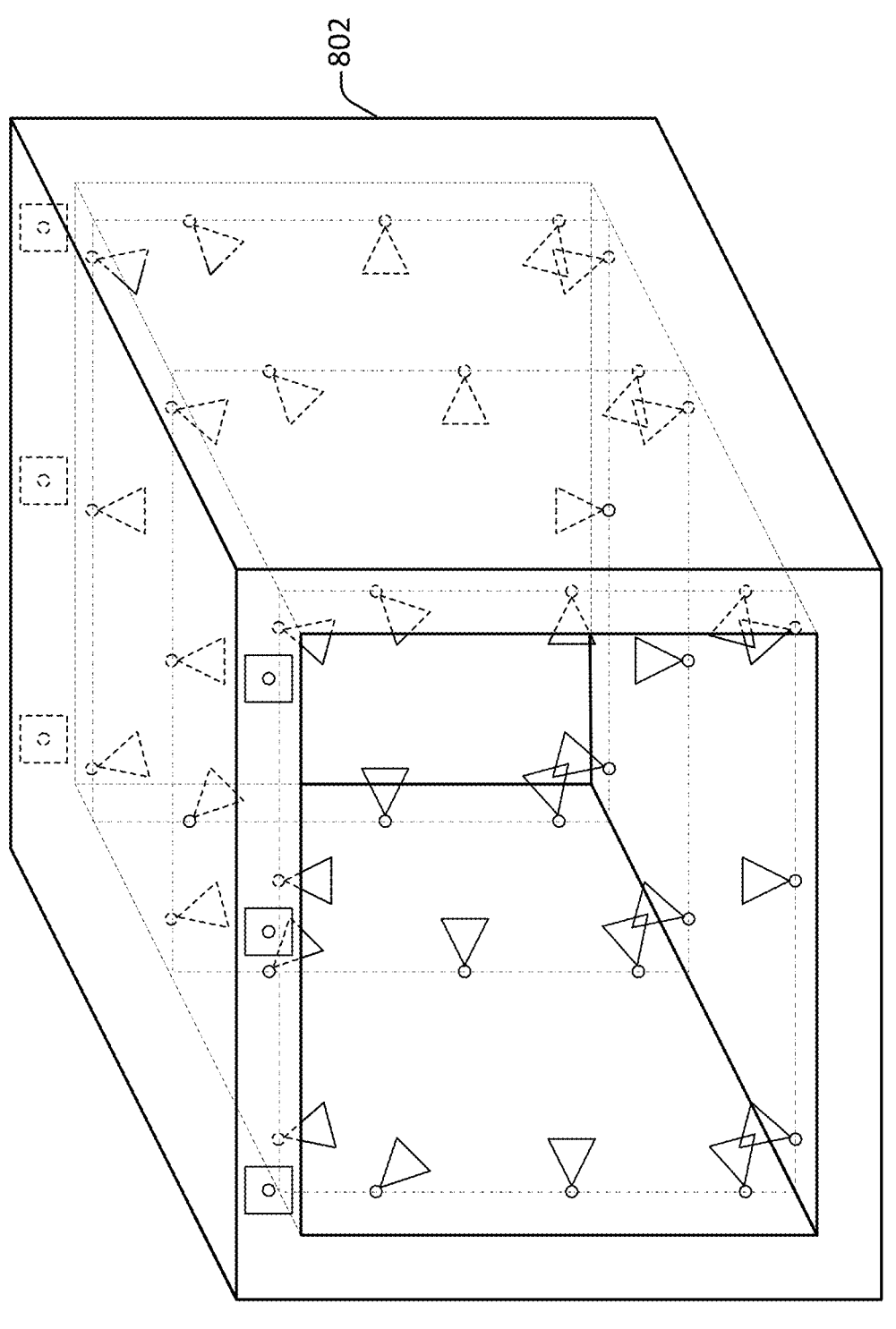
FIG. 9 shows a perspective diagram of a damage detection portal arranged as a tunnel, configured in accordance with one or more embodiments.

FIG. 8 shows a top-down diagram of a damage detection portal 802 arranged as a tunnel, configured in accordance with one or more embodiments. The FIG. 9 shows a perspective diagram of a damage detection portal 802 arranged as a tunnel, configured in accordance with one or more embodiments.

In particular embodiments, a damage detection portal may be configured as a turntable. In such a configuration, a vehicle may first be positioned onto the turntable. The turntable may then rotate to present the vehicle at different angles to one or more fixed cameras. Alternatively, a turntable configuration may leave the vehicle in a fixed position while a camera assembly rotates around the vehicle. As yet another example, both the vehicle and the camera assembly may be rotated, for instance in opposite directions.

According to various embodiments, in a turntable configuration, the turntable may rotate any suitable amount. For instance, the turntable may rotate 360 degrees, 720 degrees, or 180 degrees.

Figure 10B:
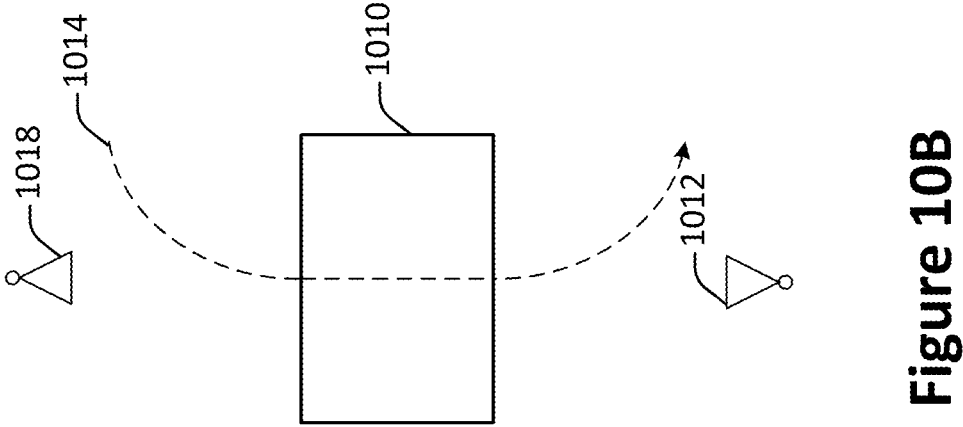
FIG. 10B shows a top-down view of a damage detection portal, configured in accordance with one or more embodiments.
Figure 10A:
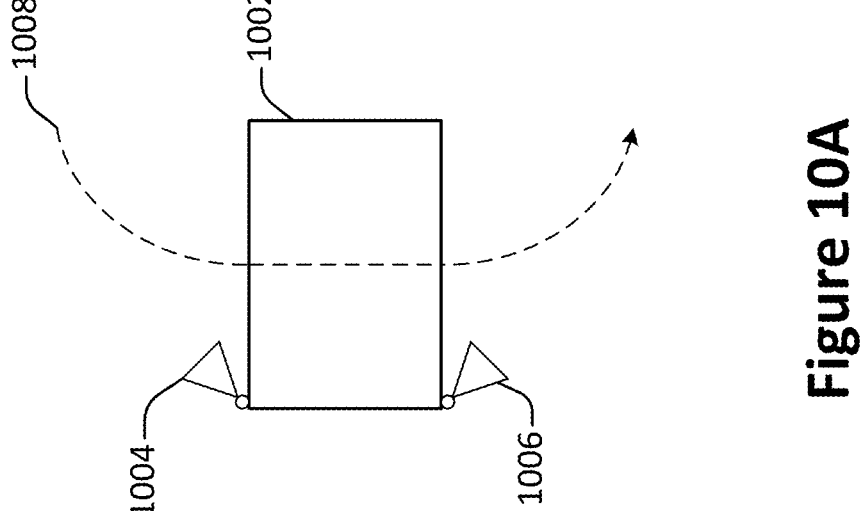
FIG. 10A shows a top-down view of a damage detection portal, configured in accordance with one or more embodiments.

FIG. 10A shows a top-down views of a damage detection portal 1002, configured in accordance with one or more embodiments. The damage detection portal 1002 is configured to employ a drive path 1008 that is curved both entering and leaving the damage detection portal 1002. Due to the configuration of the cameras and the drive path, the camera 1004 is configured to capture images of a vehicle head-on at a neutral elevation (also referred to as a "hero shot") as the vehicle drives toward the camera and then turns into the damage detection portal. Similarly, the camera 1006 is configured to capture images of the vehicle tail-on at a neutral elevation as the vehicle leaves the damage detection portal 1002 and then curves away from the portal.

FIG. 10B shows a top-down views of a damage detection portal 1010, configured in accordance with one or more embodiments. The damage detection portal 1010 is configured to employ a drive path 1014 that is curved both entering and leaving the damage detection portal 1010. Due to the configuration of the cameras and the drive path, the camera 1018 is configured to capture images of a vehicle tail-on at a neutral elevation as the vehicle drives toward the camera and then turns into the damage detection portal. Similarly, the camera 1012 is configured to capture images of the vehicle head-on at a neutral elevation as the vehicle leaves the damage detection portal 1002 and then curves away from the portal.

Figure 11B:
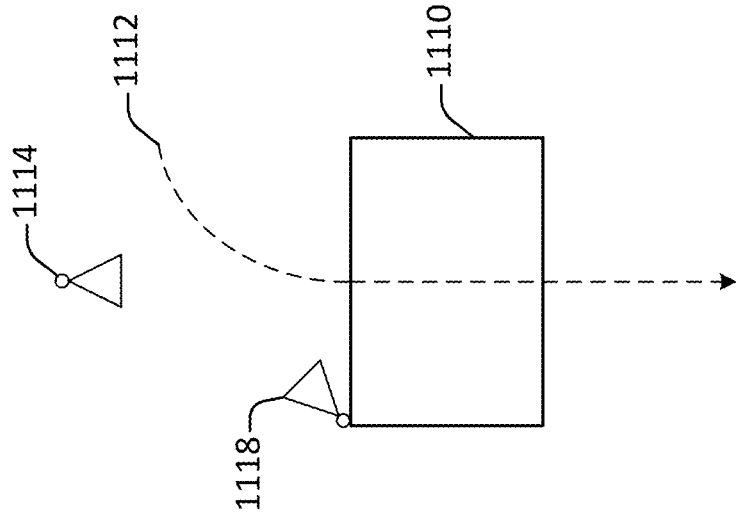
FIG. 11B shows a top-down views of a damage detection portal, configured in accordance with one or more embodiments.
Figure 11A:
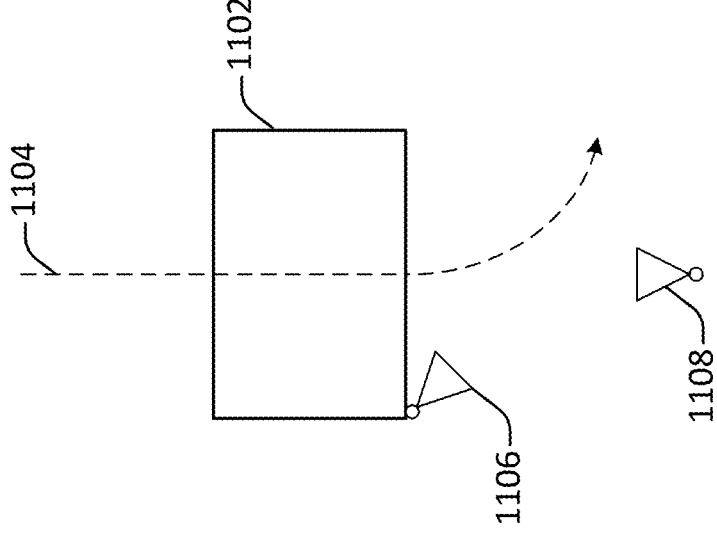
FIG. 11A shows a top-down views of a damage detection portal, configured in accordance with one or more embodiments.

FIG. 11A shows a top-down views of a damage detection portal 1102, configured in accordance with one or more embodiments. The damage detection portal 1102 is configured to employ a drive path 1108 that is straight entering but curved leaving the damage detection portal 1102. Due to the configuration of the cameras and the drive path, the camera 1108 is configured to capture images of a vehicle head-on at a neutral elevation as the vehicle leaves the damage detection portal 1102 and then curves away from the portal. Similarly, the camera 1106 is configured to capture images of the vehicle tail-on at a neutral elevation as the vehicle leaves the damage detection portal 1102 and then curves away from the portal.

FIG. 11B shows a top-down views of a damage detection portal 1110, configured in accordance with one or more embodiments. The damage detection portal 1110 is configured to employ a drive path 1114 that is curved entering and straight leaving the damage detection portal 1110. Due to the configuration of the cameras and the drive path, the camera 1118 is configured to capture images of a vehicle head-on at a neutral elevation as the vehicle drives toward the camera and then turns into the damage detection portal. Similarly, the camera 1114 is configured to capture images of the vehicle tail-on at a neutral elevation as the vehicle turns into the damage detection portal.

Figure 12:
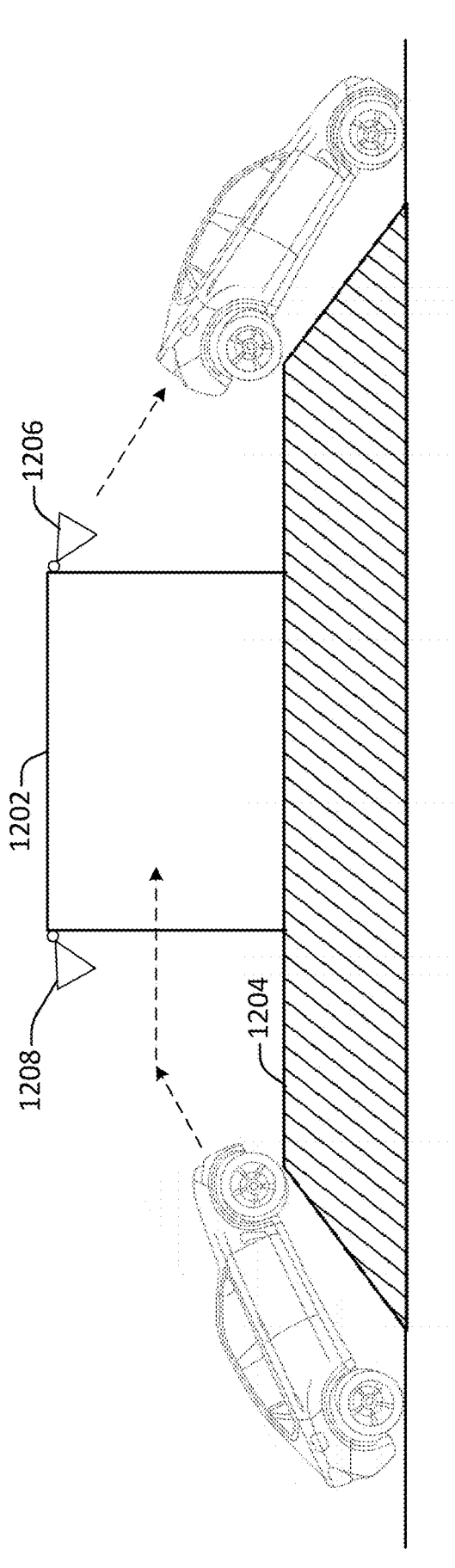
FIG. 12 shows a side-view diagram of a damage detection portal as a vehicle drives through it, configured in accordance with one or more embodiments.

FIG. 12 shows a side-view diagram of a damage detection portal 1202 as a vehicle drives through it, configured in accordance with one or more embodiments. The damage detection portal 1202 is positioned on a ramp 1204. In this way, the camera 1208 can capture a frontal view of the vehicle head-on (i.e., a "hero shot") as the vehicle drives up the ramp before it levels off into the damage detection portal. Similarly, the camera 1206 can capture a rear view of the vehicle tail-on as the vehicle leaves the damage detection portal and drives down the ramp.

Figure 27:
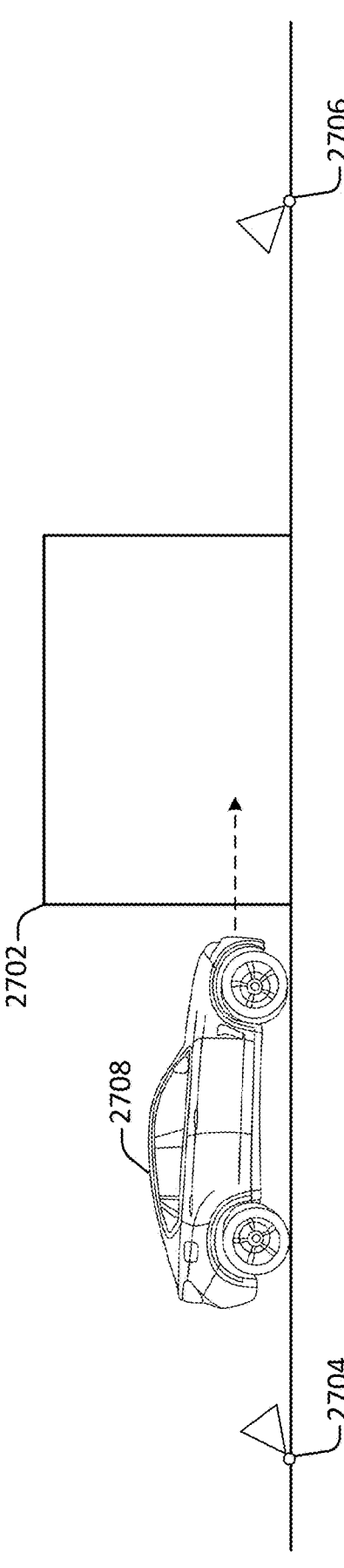
FIG. 27 shows a side-view of a damage detection portal as a vehicle drives through it, configured in accordance with one or more embodiments.

FIG. 27 shows a side-view of a damage detection portal 2702 as a vehicle 2708 drives through it, configured in accordance with one or more embodiments. The damage detection portal 2702 may include some number of cameras arranged as described with respect to FIGS. 6-12 or arranged in a different configuration. In addition, the damage detection portal 2702 may be configured to communicate with the cameras 2704 and/or 2706, which may capture images of the vehicle 2708 before and/or after it enters the damage detection portal 2702.

According to various embodiments, the diagrams shown in FIGS. 6-12 and 27 illustrate only a few of the possible configurations of a damage detection portal. Various configurations are possible and in keeping with the techniques and mechanisms described herein.

Figure 13:
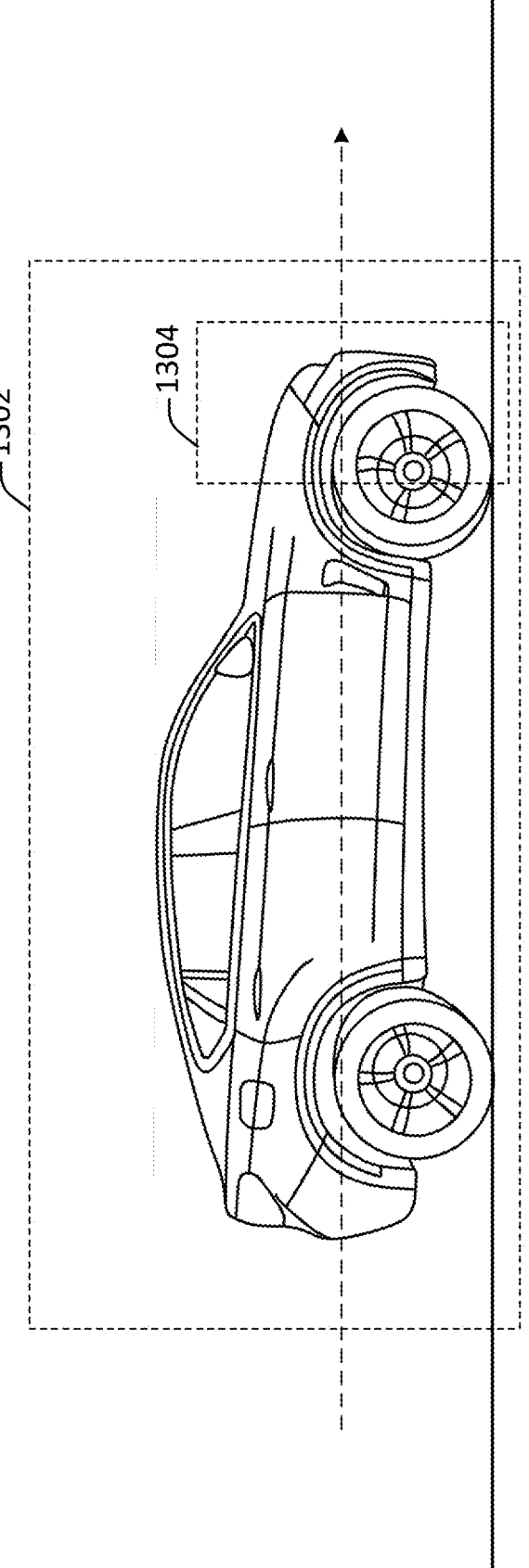
FIG. 13 illustrates the capture of image data via a damage detection portal, generated in accordance with one or more embodiments.

FIG. 13 illustrates the capture of image data via a damage detection portal, generated in accordance with one or more embodiments. According to various embodiments, one or more cameras may be configured to capture a whole-vehicle image such as the image 1302 as the vehicle drives through the portal. Alternatively, or additionally, one or more cameras may be configured to capture a closeup view such as the image 1304 as the vehicle drives through the portal. By combining these views, a user may be able to select a portion of a whole-vehicle image and then zoom in to a view captured by a closeup camera.

Figure 14:
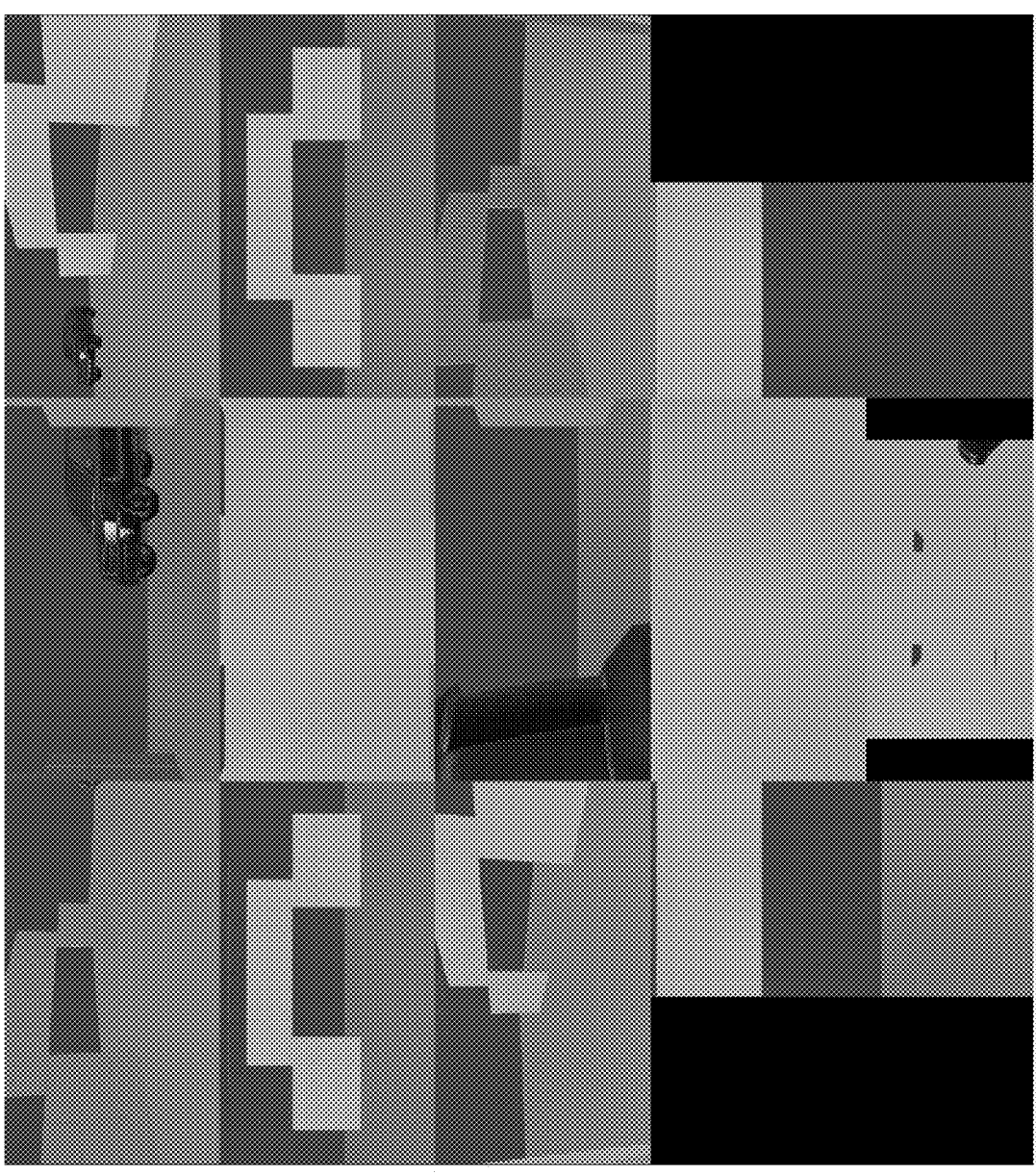
FIGS. 14-16 show simulated images captured by a damage detection portal, generated in accordance with one or more embodiments.
Figure 15:
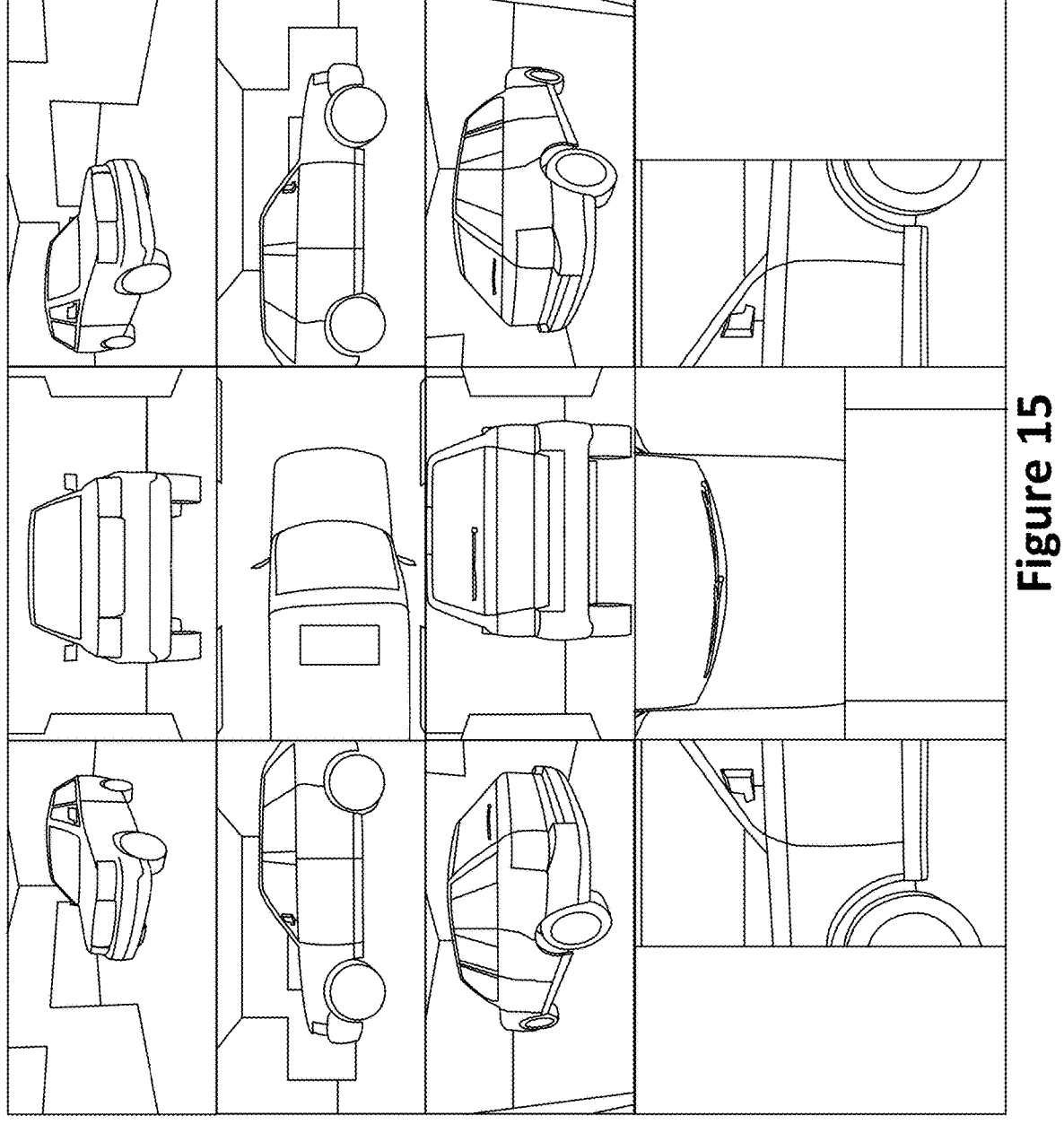
Figure 16:
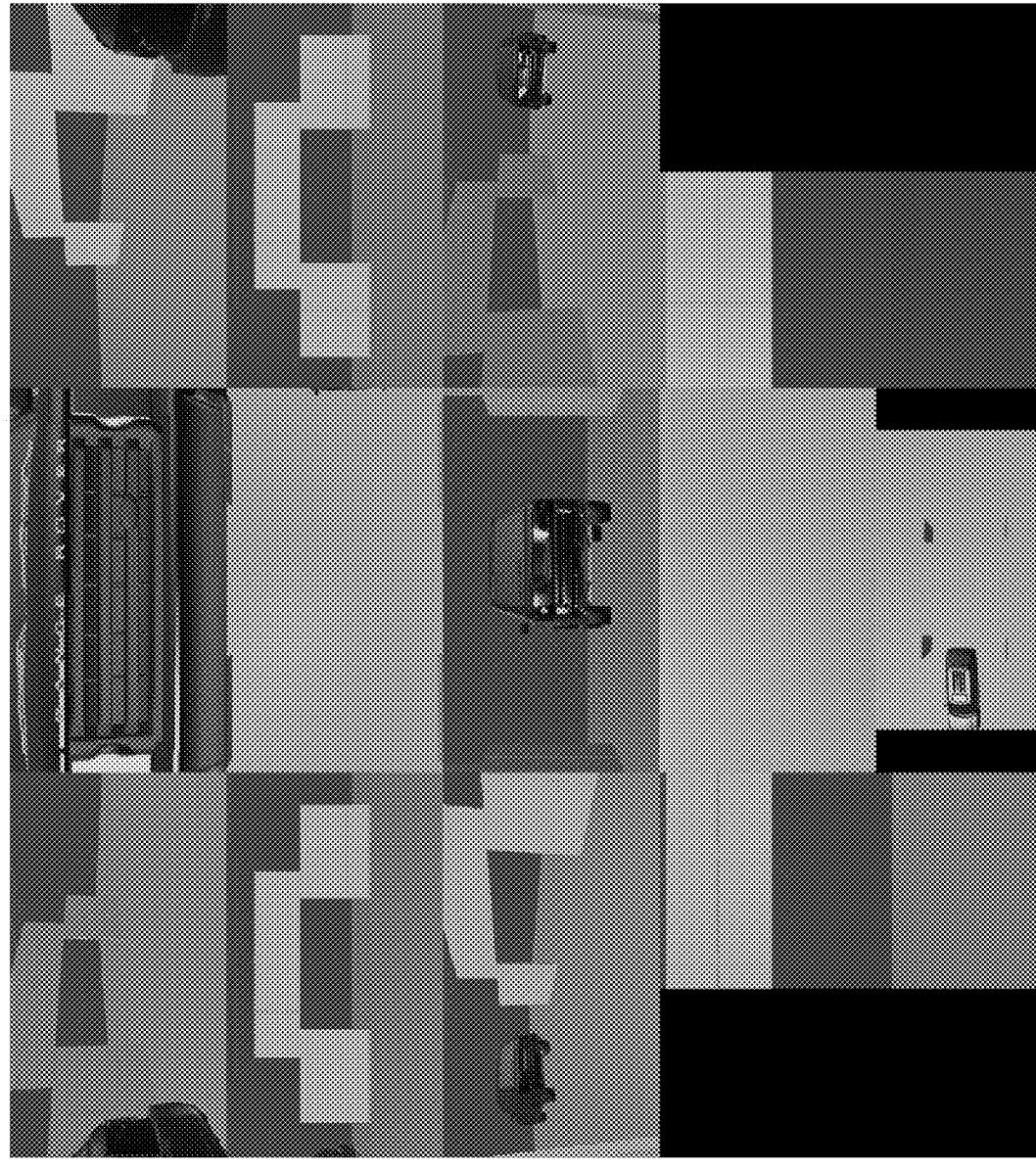

FIGS. 14-16 show simulated images captured by a damage detection portal, generated in accordance with one or more embodiments. In FIG. 14, a vehicle is shown prior to entering into the portal. In FIG. 15, the vehicle is shown in the portal. In FIG. 16, a vehicle is shown leaving the portal.

Figure 17:
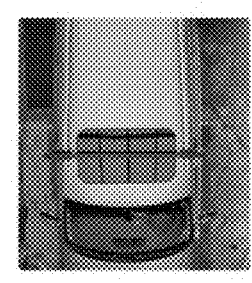
FIGS. 17-19 show images captured via a damage detection portal and presented in a user interface, generated in accordance with one or more embodiments.
Figure 17:
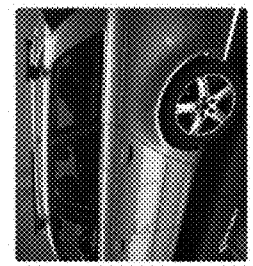
Figure 17:
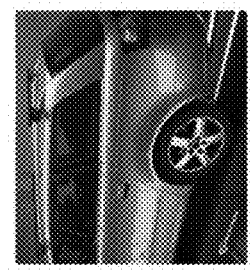
Figure 17:
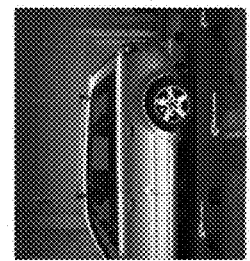
Figure 17:
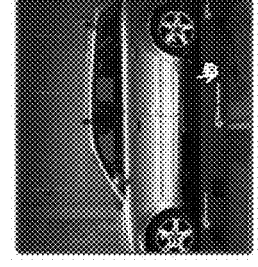
Figure 17:
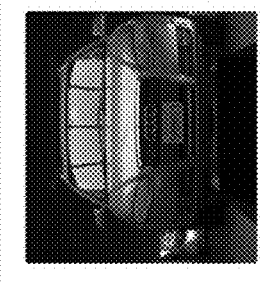
Figure 17:
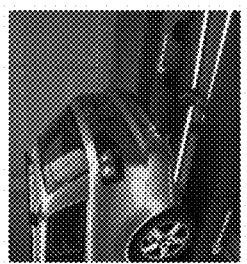
Figure 17:
Figure 18:
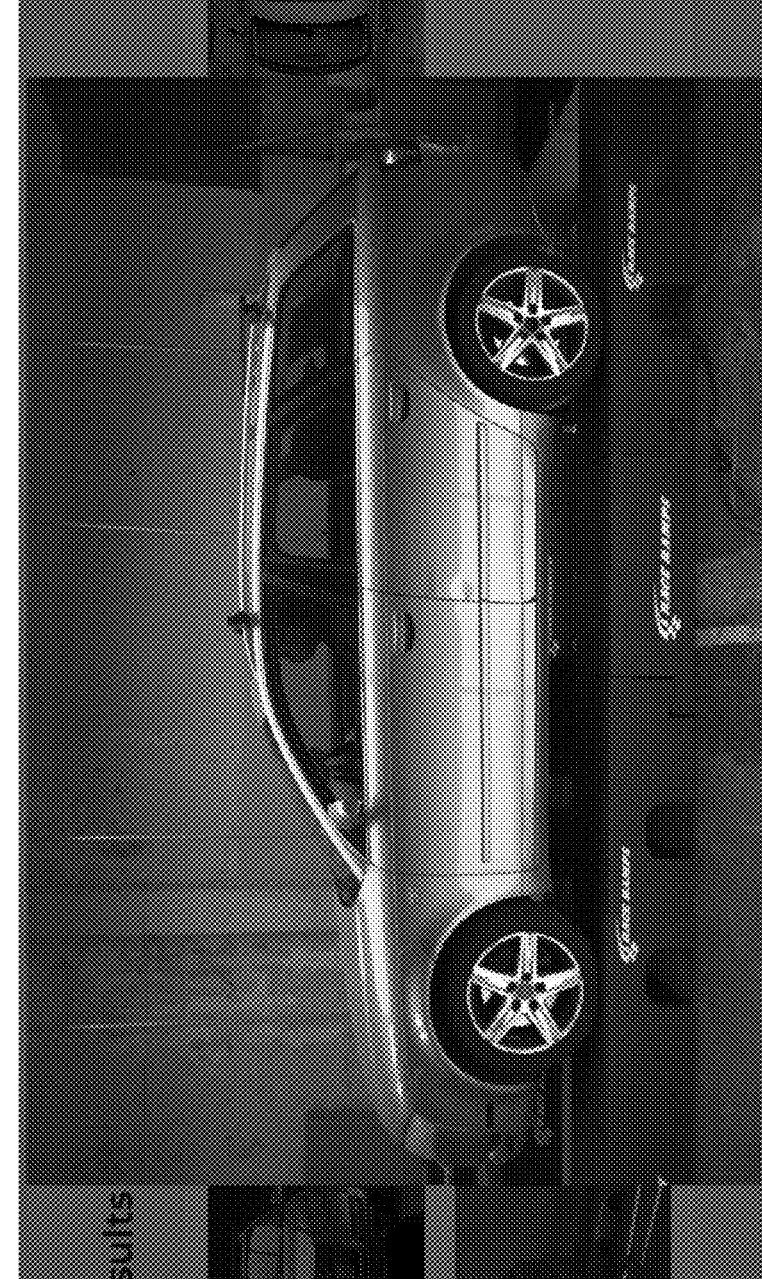
Figure 19:
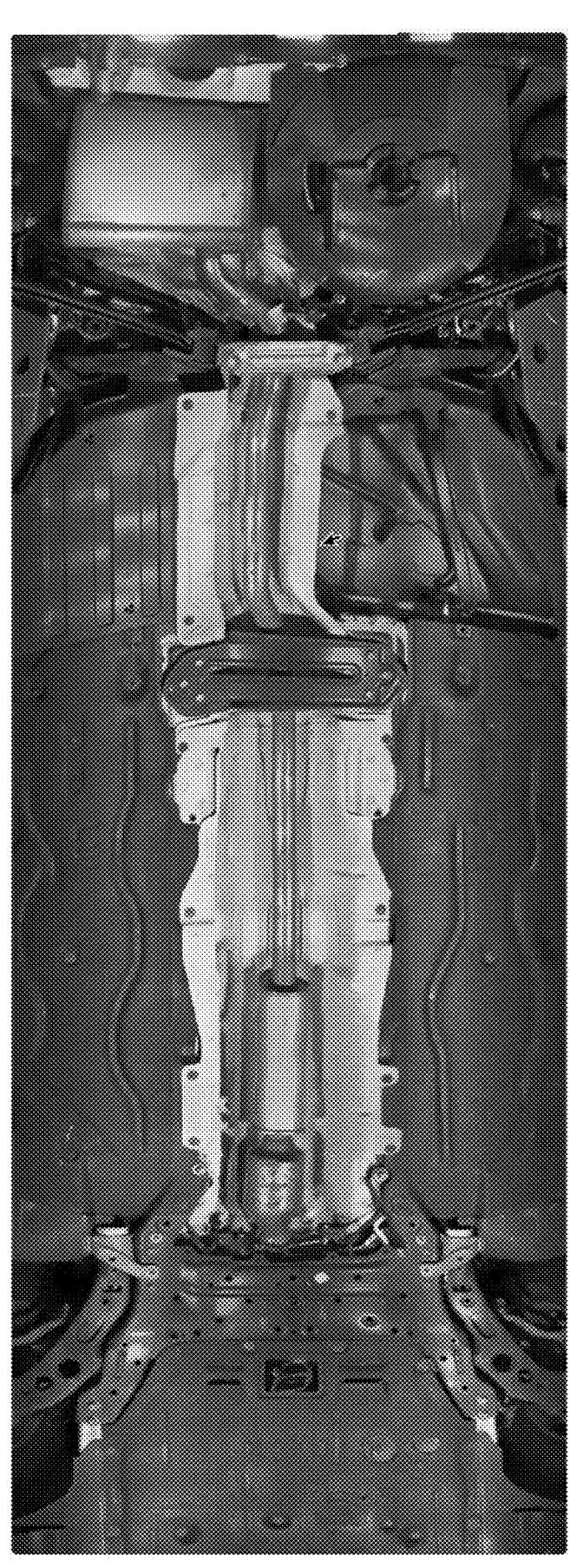
Figure 19:

FIGS. 17-19 show images captured via a damage detection portal and presented in a user interface, generated in accordance with one or more embodiments. In FIG. 17, images of a vehicle captured from different perspectives are shown. When one of the images is selected, it may be enlarged, as shown in FIG. 18. As shown in FIG. 19, one or more images may be captured of the undercarriage of the vehicle.

Figure 20:
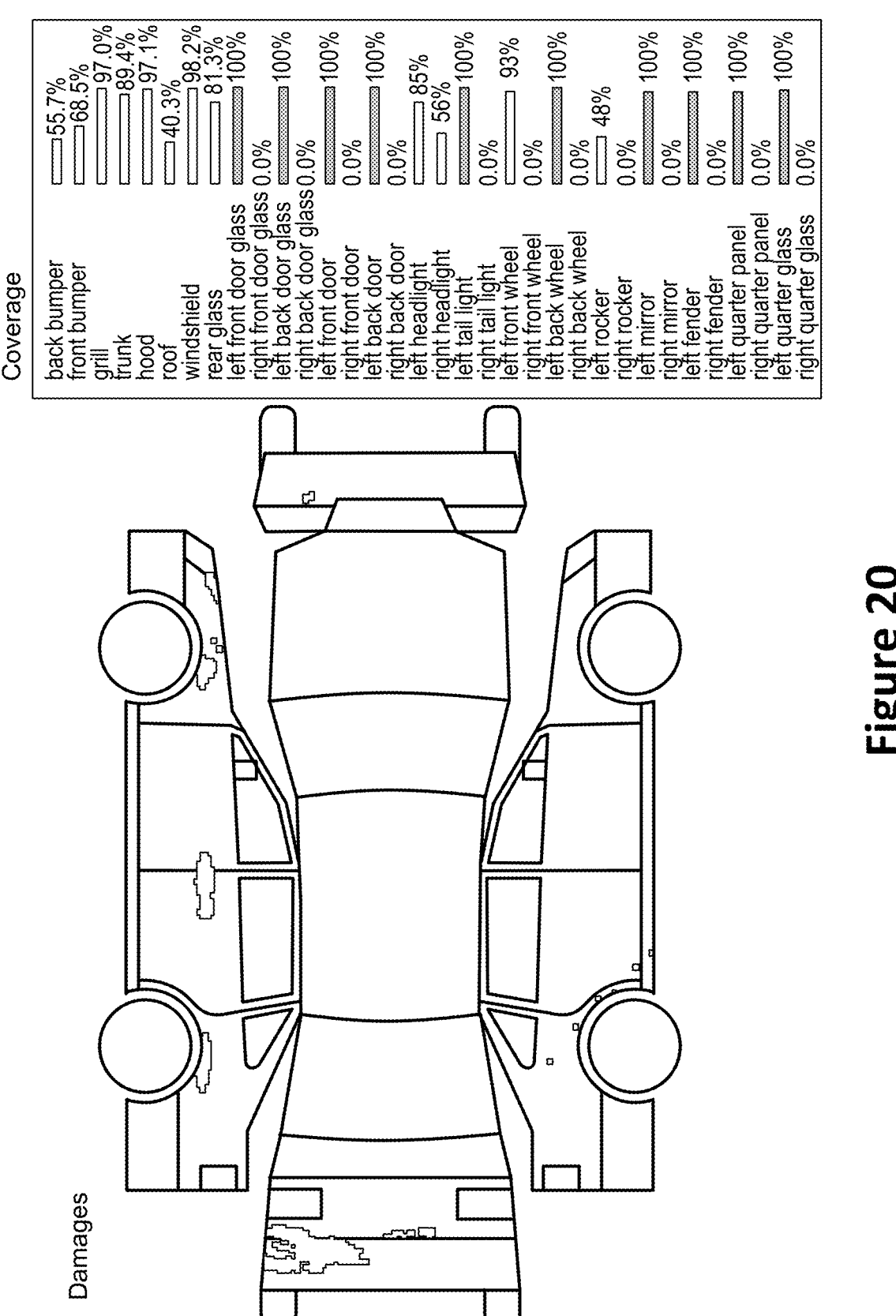
FIG. 20 illustrates a portion of the user interface in which detected damage is shown, configured in accordance with one or more embodiments.
Figure 21:
FIGS. 21-25 illustrate images captured via the damage detection portal and presented in the user interface, configured in accordance with one or more embodiments.
Figure 22:

FIG. 20 illustrates a portion of the user interface in which detected damage is shown, configured in accordance with one or more embodiments. In FIG. 20, detected damage is illustrated on a top-down view of the vehicle as a heatmap. On the right, a list of components of the vehicle is shown, along with a status bar and percentage indicating the degree of coverage provided by the captured images.

FIGS. 21-25 illustrate images captured via the damage detection portal and presented in the user interface, configured in accordance with one or more embodiments. In some embodiments, an image may be selected by clicking on or touching damage represented in the top-down view. For instance, clicking on or touching the damage shown on the left door panels in FIG. 20 may lead to the presentation of the image shown in FIG. 21.

Figure 23:
Figure 24:

In some implementations, a selected image may be a portion of a closeup multi-view interactive digital media representation (MVIDMR) of the selected region. The closeup MVIDMR may depict the selected portion of the vehicle from different perspectives. The user may navigate between these different perspectives by, for example, clicking and dragging a mouse, or touching and dragging on a touch screen. For example, in FIG. 21, the user has selected an area in the center of the image and then dragged to one side, leading the user interface to present the image shown in FIG. 22, which depicts the same area of the vehicle from a different perspective. A similar operation is shown in FIGS. 23 and 24, which depict a different closeup MVIDMR of the back left area of the vehicle.

Figure 25:
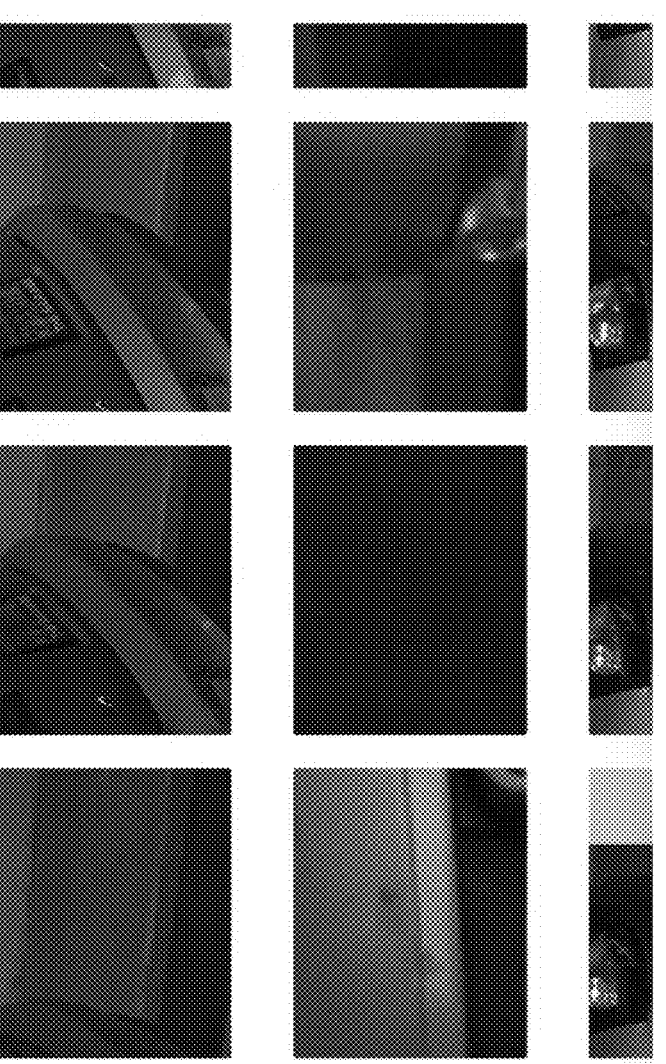

According to various embodiments, damage to the vehicle may be identified in a list, such as that shown in FIG. 25. The identified damage may include information such as the location that was damaged, the type of damage (e.g., a dent, or paint damage), a confidence level associated with the detected damage, and/or the severity of the damage.

Figure 26:
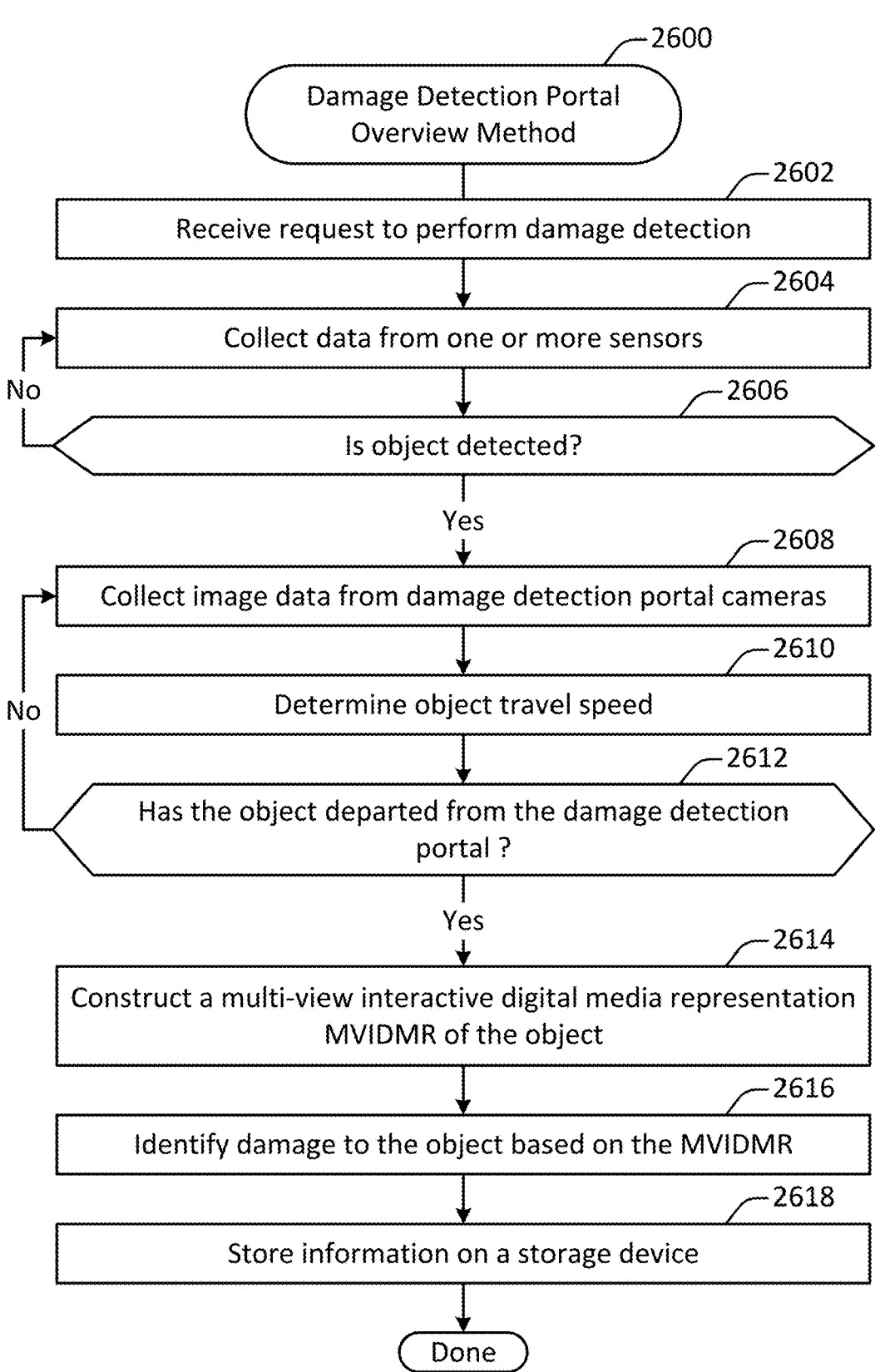
FIG. 26 illustrates an overview method for the operation of a damage detection portal, performed in accordance with one or more embodiments.

FIG. 26 illustrates an overview method 2600 for the operation of a damage detection portal, performed in accordance with one or more embodiments. According to various embodiments, the method 2600 may be performed at a damage detection portal or computing device in communication with a damage detection portal. Alternately, or additionally, some or all of the method 2600 may be performed at a remote computing device such as a server. The method 2600 may be used to detect damage to any of various types of objects. However, for the purpose of illustration, many examples discussed herein will be described with reference to vehicles.

A request to perform damage detection is received at 2602. According to various embodiments, the request may be based on user input. For instance, a user may transmit a request to initiate damage detection. Alternatively, or additionally, the request may be automatically generated. For instance, damage detection may begin automatically when the system is activated.

Data from one or more sensors is collected at 2604. According to various embodiments, the sensor data may include information collected from one or more pressure sensors, cameras, light sensors, or any other suitable sensors.

A determination is made at 2606 as to whether an object is detected. In some implementations, the sensor data may be used to determine when an object is approaching the damage detection portal. The determination may be limited, for instance detecting whether a laser sensor has been interrupted or a pressure panel has been tripped. Alternatively, the determination may involve performing sophisticated object recognition based on visual data collected from one or more cameras.

When an object is detected, then at 2608 image data from one or more damage detection portal cameras is collected. As discussed herein, a damage detection portal may have multiple cameras that capture image data of the object at different angles and from different viewpoints.

Object travel motion is determined at 2610. In some implementations, the object travel motion may be determined based on one or more sensors such as cameras, pressure sensors, laser sensers, radar sensors, sonar sensors, or any other suitable sensors. The object travel motion may be used to inform the rate at which visual data is captured. For instance, visual data capture may be adjusted so as to capture a relatively constant amount of visual data regardless of object speed. When a vehicle is traveling faster, for example, cameras may be configured to capture images at a more rapid pace than when a vehicle is traveling more slowly.

According to various embodiments, object travel motion may be modeled via any or all of a variety of parameters. Such parameters may include vectored velocity, acceleration, and/or other motion elements in one, two, or three dimensions. Alternatively, or additionally, such parameters may include one or more rotational parameters, such as orientational velocity, acceleration and/or other motion elements modeled as, for example, roll, pitch, and/or yaw.

In particular embodiments, different portions of the same objection may be associated with different motion elements. For example, when an object is traveling along a curved path, the inside of the object is moving more slowly than the outside of the same object. Accordingly, object travel motion may be modeled as, for example, a three-dimensional matrix where different entries correspond with different portions of an object, and where a value in the matrix is multi-dimensional, corresponding to, for instance, a 6-degree of freedom indication of the vectored and orientational motion of a portion of the object.

A determination is made at 2612 as to whether the object has departed from the damage detection portal. According to various embodiments, the determination may be made based on one or more of a combination of data sources. For example, a pressure sensor may detect when an object has moved away from the portal. As another example, image information may be used to determine that an object is no longer present in the area of the portal. As yet another example, a laser or other sensor may be detect when an object has passed a designated point along a path.

When the object has departed from the damage detection platform, an MVIDMR of the object is constructed at 2614. According to various embodiments, image data may be used to construct an overall MVIDMR of the entire object. Additionally, one or more focused MVIDMRs may be constructed of particular areas or components of the object. For example, a focused MVIDMR of a vehicle component may be constructed. As another example, a focused MVIDMR of a portion of a vehicle in which damage has been detected may be constructed.

Damage to the object based on the MVIDMR is identify at 2616. According to various embodiments, any of a variety of techniques may be used to perform damage detection. Examples of such damage detection techniques are described throughout the application, for instance with respect to the FIGS. 1-5.

Information is stored on a storage device at 2618. According to various embodiments, storing the information may involve transmitting information via a communication interface over a network to a remote storage location and/or storing the information on a local storage device. The information stored may include, but is not limited to: raw image and/or video data, sound data captured as the object passed through the portal, one or more MVIDMRs constructed as discussed at operation 2616, and/or damage detection information determined as discussed at operation 2616.

According to various embodiments, although the configuration of cameras is referred to herein as a damage detection portal, the configuration of cameras may be used for other purposes, such as to record a video of the vehicle that includes multiple perspectives.

According to various embodiments, although the object captured by the damage detection portal is referred to herein as a vehicle, information about other types of objects may be captured in a similar fashion. For example, a damage detection portal may be used to capture information about a patient in a medical setting. As another example, a damage detection portal may be used to capture information about an individual for security purposes. As yet another example, a damage detection portal may be used to capture information about animals. As still another example, a damage detection portal may be used to capture information about objects on an assembly line. A variety of configurations and applications are possible.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:

capturing a plurality of images from a plurality of cameras of an object moving along a pre-determined path associated with a fixed damage detection portal structure through which the object moves, each of the cameras being fixed at a respective identified location in three-dimensional space on the fixed damage detection structure, wherein the path is curved at an end of the fixed damage detection structure to capture a head-on or tail-on view of the object, wherein the plurality of cameras are synchronized to capture images at one of: the same time or at staggered times by a fixed time period;

determining correspondence information for the plurality of images, the correspondence information linking locations on different ones of the images captured from different cameras in the plurality of cameras, linked locations corresponding to similar portions of the object;

analyzing the plurality of images using a processor to implement damage analysis; and presenting on a display screen a graphical user interface that includes a portion of the plurality of images grouped based on the correspondence information, wherein the graphical user interface allows a user to change the view direction towards a part of the object by switching from a first image captured by a first camera to a second image captured by the second camera, the first and second images linked via correspondence information.

2. The method recited in claim 1, the method further comprising:

determining an object motion based on the plurality of images and the identified locations.

3. The method recited in claim 2, wherein the correspondence information for the plurality of images is determined at least in part based on the object motion.

4. The method recited in claim 1, the method further comprising:

detecting damage to the object based on the plurality of images.

5. The method recited in claim 4, wherein detecting damage to the object involves applying a neural network to one or more of the plurality of images.

6. The method recited in claim 4, wherein the portion of the plurality of images include images that include the detected damage.

7. The method recited in claim 4, wherein the graphical user interface includes a heat map indicating the detected damage.

8. The method recited in claim 1, wherein some or all of the plurality of cameras are positioned on one or more rigid structures.

9. The method recited in claim 8, wherein the structure is positioned over a roadway, and wherein the object is a vehicle driven along the roadway.

10. The method recited in claim 1, wherein determining the correspondence information involves constructing a three-dimensional model of the object based at least in part on the plurality of images and the identified locations.

11. The method recited in claim 1, the method further comprising:

detecting the object based on image data captured from one or more of the plurality of cameras, wherein the plurality of images are captured when the object is detected.

12. The method recited in claim 1, wherein the plurality of cameras include an undercarriage camera configured to capture one or more images from beneath the object.

13. The method recited in claim 1, wherein the portion of the plurality of images is navigable in one or more dimensions.

14. The method recited in claim 1, wherein analyzing the plurality of images to implement damage analysis comprises:

extracting a skeleton from the plurality of images, the skeleton representing a plurality of components of the object;

selecting a skeleton component from the plurality of components; and detecting damage to the selected skeleton component based on one or more images from the plurality of images that depict the selected skeleton component.

15. The method recited in claim 1, wherein analyzing the plurality of images to implement damage analysis comprises:

mapping the plurality of images to a top-down view of the object; and detecting damage by comparing the mapped plurality of images to reference data in the top-down view.

16. The method recited in claim 1, wherein the path includes a ramp that changes an elevation of the object as it moves relative to the fixed damage detection structure, and wherein a first camera of the plurality of cameras is positioned to capture a head-on view of the object as the object moves up the ramp.

17. A system comprising:

a plurality of cameras each positioned at a respective identified location in three-dimensional space and capturing a plurality of images from a plurality of cameras of an object moving along a pre-determined path associated with a fixed damage detection structure through which the object moves, each of the cameras being fixed at a respective identified location in three-dimensional space on the fixed damage detection structure, wherein the path is curved at an end of the fixed damage detection-structure to capture a head-on or tail-on view of the object, wherein the plurality of cameras are synchronized to capture images at one of: the same time or at staggered times by a fixed time period;

a processor configured to determine correspondence information for the plurality of images, the correspondence information linking locations on different ones of the images captured from different cameras in the plurality of cameras, linked locations corresponding to similar portions of the object, the processor further configured to analyzing the plurality of images to implement damage analysis; and a communication interface configured to transmit information for presenting a graphical user interface on a display screen, the graphical user interface that includes a portion of the plurality of images grouped based on the correspondence information, wherein the graphical user interface allows a user to change the view direction towards a part of the object by switching from a first image captured by a first camera to a second image captured by the second camera, the first and second images linked via correspondence information.

18. The system recited in claim 17, wherein the processor is further configured to:

determine an object motion based on the plurality of images and the identified locations, wherein the correspondence information for the plurality of images is determined at least in part based on the object motion.

19. One or more non-transitory computer readable media having instructions stored thereon for performing a method, the method comprising:

capturing a plurality of images from a plurality of cameras of an object moving along a pre-determined path associated with a fixed damage detection portal structure through which the object moves, each of the cameras being fixed at a respective identified location in three-dimensional space on the fixed damage detection structure, wherein the path is curved at an end of the fixed damage detection structure to capture a head-on or tail-on view of the object, wherein the plurality of cameras are synchronized to capture images at one of: the same time or at staggered times by a fixed time period;

determining correspondence information for the plurality of images, the correspondence information linking locations on different ones of the images captured from different cameras in the plurality of cameras, linked locations corresponding to similar portions of the object;

analyzing the plurality of images using a processor to implement damage analysis; and presenting on a display screen a graphical user interface that includes a portion of the plurality of images grouped based on the correspondence information, wherein the graphical user interface allows a user to change the view direction towards a part of the object by switching from a first image captured by a first camera to a second image captured by the second camera, the first and second images linked via correspondence information.

\* \* \* \* \*